(12) United States Patent
Bentley et al.

(10) Patent No.: US 11,645,685 B2
(45) Date of Patent: May 9, 2023

(54) DYNAMICALLY ADJUSTING TRANSPORTATION PROVIDER POOL SIZE

(71) Applicant: Lyft, Inc., San Francisco, CA (US)

(72) Inventors: Helen Wai-Quen Bentley, San Francisco, CA (US); Aidan Church, San Francisco, CA (US); John Torres Fremlin, New York City, NY (US); Matthew Lawrence Green, San Francisco, CA (US); Mayank Gulati, San Francisco, CA (US); Yilei Li, Redwood City, CA (US); Demitri Nava, New York City, NY (US); Mengqi Niu, San Francisco, CA (US); Daniel Allen Sullivan, San Francisco, CA (US); Garrett van Ryzin, Brooklyn, NY (US); Rachel Marie Wasko, San Francisco, CA (US); Shashi Kant Sharma, Redwood City, CA (US)

(73) Assignee: Lyft, Inc., San Francisco, CA (US)

( * ) Notice: Subject to any disclaimer, the term of this patent is extended or adjusted under 35 U.S.C. 154(b) by 532 days.

(21) Appl. No.: 16/672,234

(22) Filed: Nov. 1, 2019

(65) Prior Publication Data
US 2020/0410865 A1 Dec. 31, 2020

Related U.S. Application Data

(60) Provisional application No. 62/867,174, filed on Jun. 26, 2019.

(51) Int. Cl.
*G06Q 10/04* (2012.01)
*G01C 21/34* (2006.01)
(Continued)

(52) U.S. Cl.
CPC ....... *G06Q 30/0284* (2013.01); *G01C 21/343* (2013.01); *G01C 21/3438* (2013.01);
(Continued)

(58) Field of Classification Search
CPC .. G06Q 30/0284; G06Q 10/02; G06Q 10/047; G06Q 10/063; G06Q 50/30;
(Continued)

(56) References Cited

U.S. PATENT DOCUMENTS

| 10,402,771 B1 | 9/2019 | De et al. |
| 10,552,773 B1 | 2/2020 | Shah et al. |

(Continued)

OTHER PUBLICATIONS

U.S. Appl. No. 16/672,260, Jan. 24, 2020, Office Action.
(Continued)

*Primary Examiner* — Ig T An
*Assistant Examiner* — Stephanie T Su
(74) *Attorney, Agent, or Firm* — Keller Preece PLLC

(57) ABSTRACT

The disclosed systems can regulate access to an online mode for a dynamic transportation matching system. For example, based on a provider efficiency parameter associated with the dynamic transportation matching system, the disclosed systems can prevent a transportation provider device from switching to the online mode within a geographic area. In addition, the disclosed systems can detect a pattern of behavior and, based on a comparison between the pattern of behavior and a behavioral threshold, cause a transportation provider device to switch from the online mode to an offline mode. Further, the disclosed systems can provide a map interface that indicates where a transportation provider device can switch from the offline mode to the online mode. Additionally, the disclosed systems can determine priorities associated with transportation provider devices and, based on the prioritization, selectively allow the transportation
(Continued)

provider devices to switch from the offline mode to the online mode.

20 Claims, 32 Drawing Sheets

(51) Int. Cl.
  *G06Q 10/06*   (2012.01)
  *G06Q 50/30*   (2012.01)
  *G06Q 10/02*   (2012.01)
  *H04W 4/021*   (2018.01)
  *G06F 16/29*   (2019.01)
  *G01C 21/36*   (2006.01)
  *G08G 1/00*   (2006.01)
  *G06Q 30/02*   (2012.01)
  *G06F 9/4401*   (2018.01)
  *G06Q 30/0283*   (2023.01)
  *G06Q 10/047*   (2023.01)
  *G06Q 10/063*   (2023.01)

(52) U.S. Cl.
  CPC ..... *G01C 21/3461* (2013.01); *G01C 21/3484* (2013.01); *G01C 21/3617* (2013.01); *G06F 9/4418* (2013.01); *G06F 16/29* (2019.01); *G06Q 10/02* (2013.01); *G06Q 10/047* (2013.01); *G06Q 10/063* (2013.01); *G06Q 50/30* (2013.01); *G08G 1/202* (2013.01); *H04W 4/021* (2013.01)

(58) Field of Classification Search
  CPC ..... G06F 16/29; G06F 9/4418; G01C 21/343; G01C 21/3438; G01C 21/3484; G01C 21/3617; G08G 1/202; H04W 4/021
  See application file for complete search history.

(56) References Cited

U.S. PATENT DOCUMENTS

| | | |
|---|---|---|
| 11,030,843 B2 | 6/2021 | Brinig et al. |
| 2014/0140495 A1 | 5/2014 | Ristock et al. |
| 2015/0161564 A1 | 6/2015 | Sweeney et al. |
| 2015/0249651 A1* | 9/2015 | Okamoto ............... H04L 63/10 713/171 |
| 2016/0042303 A1 | 2/2016 | Medina et al. |
| 2017/0352125 A1 | 12/2017 | Dicker et al. |
| 2018/0012151 A1 | 1/2018 | Wang |
| 2018/0300660 A1* | 10/2018 | Coan ..................... H04W 4/029 |
| 2018/0315148 A1 | 11/2018 | Luo et al. |
| 2018/0336653 A1 | 11/2018 | Levi |
| 2018/0342157 A1 | 11/2018 | Donnelly et al. |
| 2019/0078901 A1 | 3/2019 | Jalasutram et al. |
| 2019/0080340 A1* | 3/2019 | Berger ............... G06Q 30/0205 |
| 2019/0154454 A1 | 5/2019 | Verma et al. |
| 2019/0164432 A1* | 5/2019 | Quitoriano ............. G08G 1/205 |
| 2019/0166464 A1 | 5/2019 | Quitoriano et al. |
| 2019/0208254 A1 | 7/2019 | Raajan et al. |
| 2019/0244318 A1 | 8/2019 | Rajcok et al. |
| 2019/0354114 A1* | 11/2019 | Goldman ............. G05D 1/0297 |
| 2020/0082315 A1 | 3/2020 | Crapis et al. |
| 2020/0126175 A1 | 4/2020 | Fong et al. |
| 2020/0342418 A1 | 10/2020 | Zatta et al. |
| 2020/0380629 A1 | 12/2020 | Monteil et al. |
| 2020/0393256 A1* | 12/2020 | Sahin .................... H04W 4/024 |
| 2020/0408551 A1 | 12/2020 | Bentley et al. |
| 2020/0410624 A1* | 12/2020 | Bentley .................. G06F 16/29 |
| 2021/0081880 A1 | 3/2021 | Bivins et al. |
| 2022/0198352 A1 | 6/2022 | Benkert |
| 2022/0237728 A1 | 7/2022 | Medisetty et al. |

OTHER PUBLICATIONS

"What is Via Blue?" Downloaded on Nov. 13, 2019; https://nyc.drivewithvia.com/push/20180312_nyc_bluemode/.
U.S. Appl. No. 16/672,250, Aug. 31, 2022, Office Action.
U.S. Appl. No. 16/672,242, Oct. 6, 2022, Office Action.
Shields, Lisa, "Driving Decision-Making: An Analysis of Policy Diffusion and Its Role in the Development and Implementation of Ridesharing Regulations in Four Canadian Municipalities", Jul. 1, 2016, Western University, pp. 11-12 (Year: 2016).
U.S. Appl. No. 16/672,260, Jun. 24, 2020, Office Action.
U.S. Appl. No. 16/672,260, Aug. 27, 2020, Notice of Allowance.
U.S. Appl. No. 16/672,250, dated Feb. 13, 2023, Office Action.

\* cited by examiner

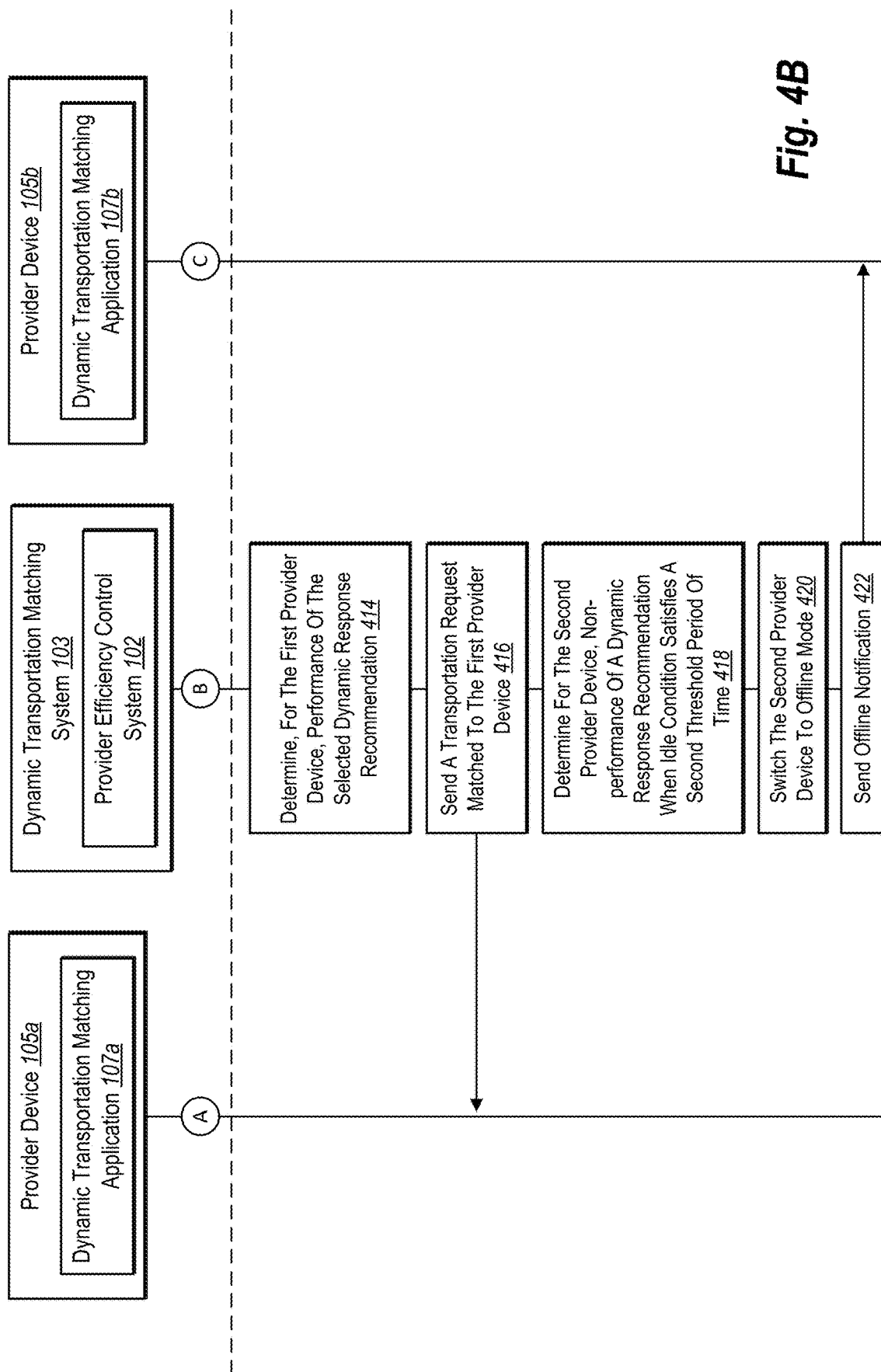

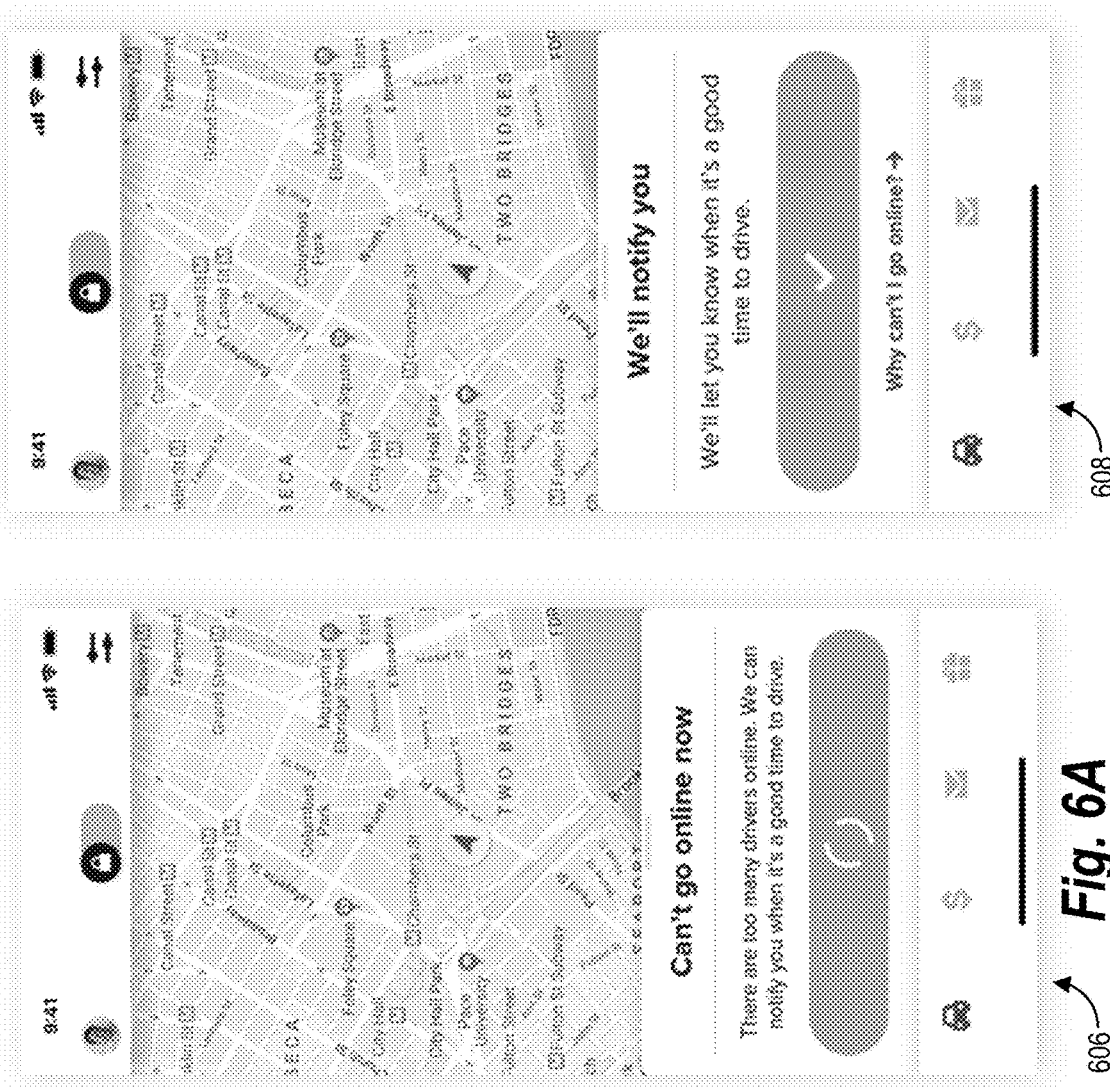
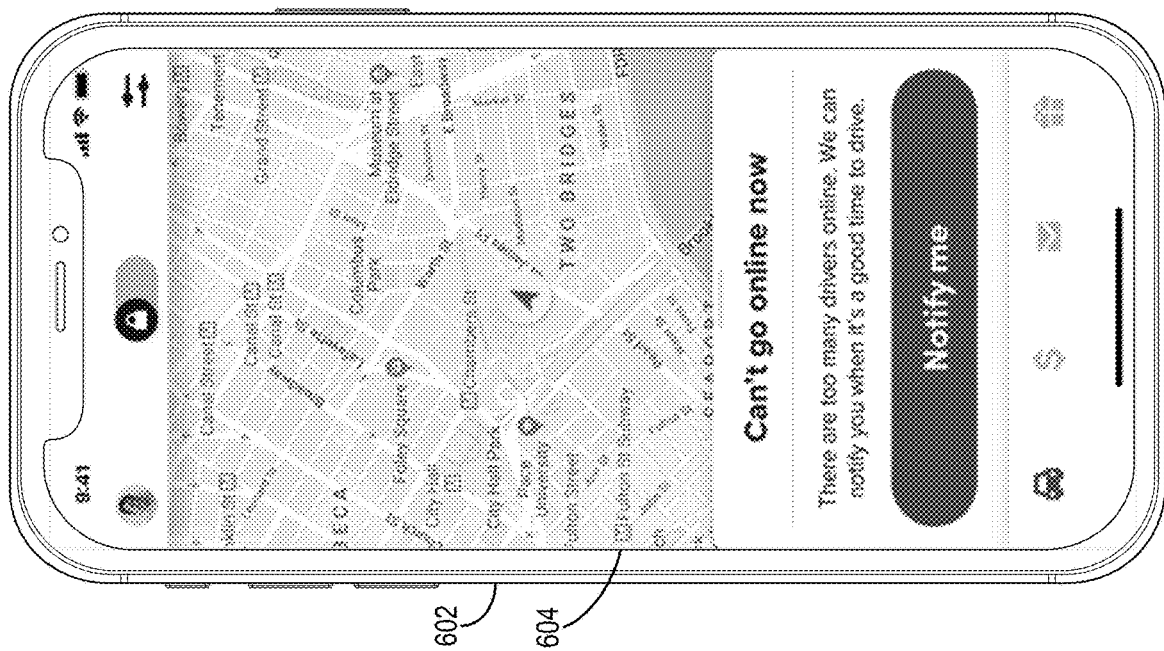
Fig. 6A

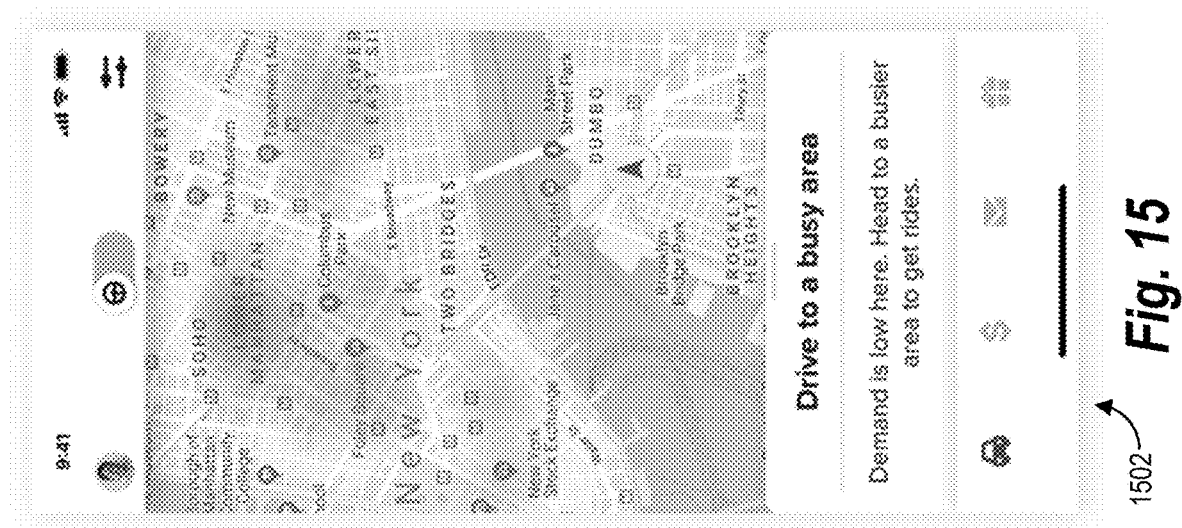

DYNAMICALLY ADJUSTING TRANSPORTATION PROVIDER POOL SIZE

CROSS-REFERENCE TO RELATED APPLICATION

This application claims the benefit of U.S. Provisional Application No. 62/867,174, filed Jun. 26, 2019, entitled DYNAMICALLY ADJUSTING TRANSPORTATION PROVIDER POOL SIZE, the contents of which are herein expressly incorporated by reference in their entirety.

BACKGROUND

Recent years have seen significant improvements in computer systems and software applications for implementing solutions relevant to transportation matching systems. For example, conventional transportation matching systems can dynamically assign transportation requests among a pool of available transportation providers. However, an unmet need exists with conventional transportation matching systems, particularly in relation to dynamically sizing the pool of available transportation providers associated with mobile application-based transportation matching systems that match transportation providers to transportation requests received from requesting users.

SUMMARY

This disclosure describes one or more embodiments of methods, non-transitory computer-readable media, and systems that solve problems in the art in addition to providing other benefits. In some embodiments, the disclosed systems regulate access to an online mode for a dynamic transportation matching system. For example, based on a provider efficiency parameter associated with a dynamic transportation matching system, the disclosed systems can prevent one or more transportation provider devices from switching to the online mode within a geographic area. Additionally or alternatively, in some embodiments, the disclosed systems can detect a pattern of behavior (e.g., an amount of idle time, a number of ride cancellations or ride-assignment lapses, etc.). In turn, the disclosed systems can compare the pattern of behavior to a threshold and, based on the comparison, cause a transportation provider device to switch from the online mode to an offline mode. Additionally or alternatively, in some embodiments, the disclosed systems can provide a map interface for display by the transportation provider device that indicates where the transportation provider device can switch from the offline mode to the online mode. Additionally or alternatively, in some embodiments, the disclosed systems can determine a priority associated with one or more transportation provider devices and, based on the prioritization, selectively allow the one or more transportation provider devices to switch from the offline mode to the online mode.

Additional features and advantages of one or more embodiments of the present disclosure will be set forth in the description which follows.

BRIEF DESCRIPTION OF THE DRAWINGS

FIGS. 4A-4B illustrate additional sequence diagrams of the provider efficiency control system regulating access to an online mode for a transportation matching system in accordance with one or more embodiments.

FIGS. 6A-6B illustrate a set of graphical user interfaces displayable on a computing device via a dynamic transportation matching application in accordance with one or more embodiments.

FIG. 15 illustrates a graphical user interface displayable on a computing device via a dynamic transportation matching application in accordance with one or more embodiments.

DETAILED DESCRIPTION

Figure 1:
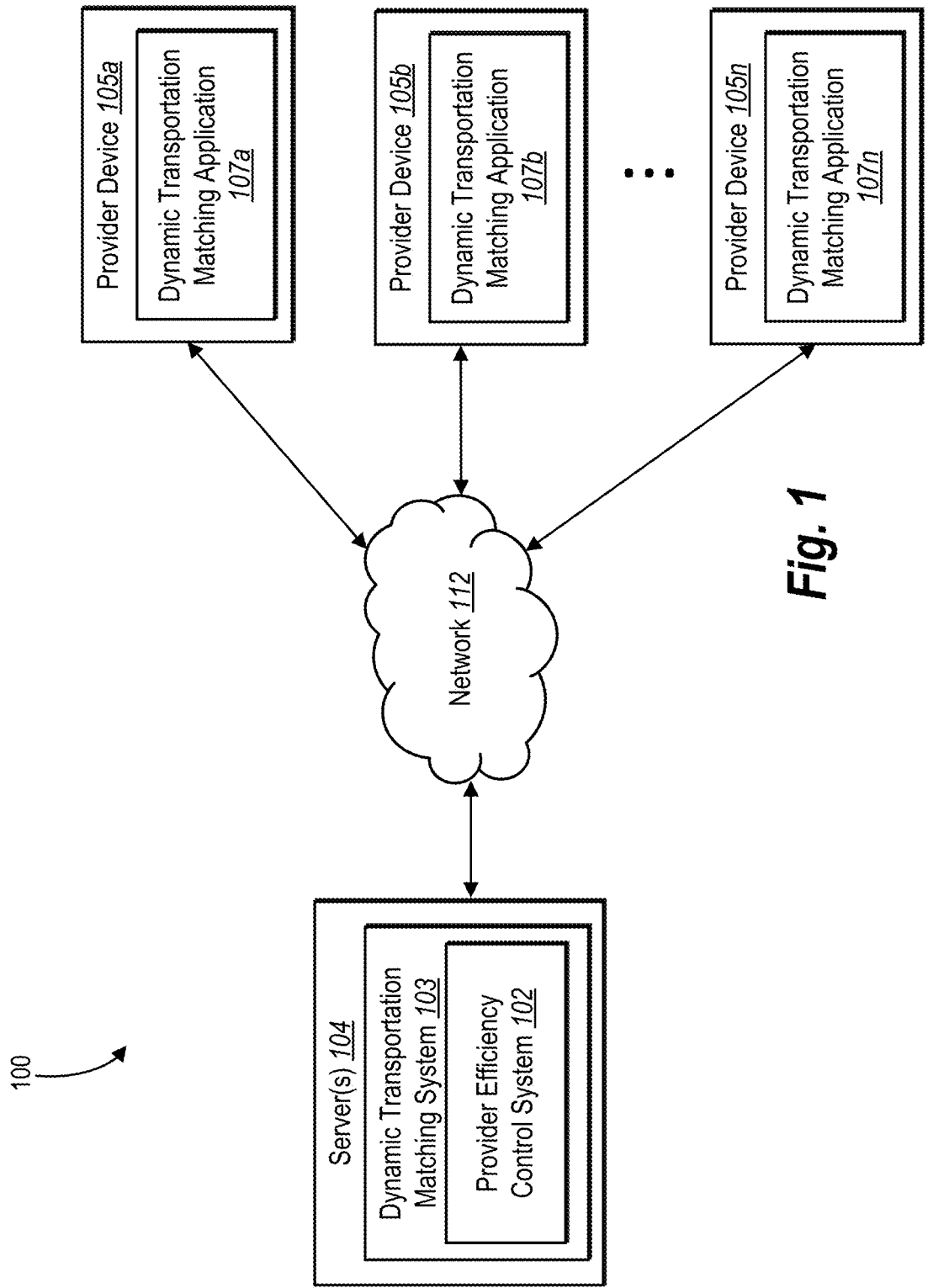
FIG. 1 illustrates a block diagram of an environment for implementing a transportation matching system in accordance with one or more embodiments.

As mentioned above, conventional systems fall short in variety of ways. For example, conventional transportation matching systems optimize (to the extent possible) the matching of transportation requests with an available pool of transportation providers (hereafter, "providers"), regardless of how that available pool of providers looks like. Accordingly, conventional transportation matching systems can face overly-complex matching scenarios that lead to increased computation and system processing. In addition to longer processing times, conventional transportation matching systems can improperly match transportation requests to providers by generating inefficient matchings of transportation requests and providers. Further, conventional transportation matching systems have difficulty accounting for variables presented by human behavior. For example, many variables are introduced upon a provider's decision to begin or end transportation services (e.g., go online/offline), accept or decline a transportation request, and/or drive to or idle at a certain location versus another location.

This disclosure describes one or more embodiments to regulate provider access to a dynamic transportation matching system that matches providers with transportation requests. Further, in one or more example embodiments, this disclosure describes a provider efficiency control system that can dynamically size a pool of available providers across one or more geographic areas (e.g., a geohash or combination of geohashes), thereby solving the above example problems and/or other problems not necessarily inferred or expressly recited. For example, by dynamically sizing the pool of available providers across one or more geographic areas, the provider efficiency control system can reduce and/or simplify an amount of computation and processing for a dynamic transportation matching system to match providers with transportation requests. Additionally, by creating an appropriately sized pool of available providers, the provider efficiency control system of the present disclosure can enable the dynamic transportation matching system to more accurately match transportation requests and providers with improved efficiencies (e.g., less estimated time to arrival or "ETA," less idle time, etc.). Further, the provider efficiency control system can reduce human decision variables introduced to the dynamic transportation matching system by providing dynamic responses or dynamic recommendations to transportation providers that generate more predictable results.

In turn, the provider efficiency control system can lend to improved experiences for providers. For example, providers can experience more predictability and generate increased earnings by better understanding ways to achieve and maintain online status for completing transportation requests. In particular, the provider efficiency control system can dynamically respond to flux in transportation requests by selectively adjusting a pool size of providers in a manner that optimizes provider efficiency and cuts provider downtime that would otherwise negatively affect provider earnings. Accordingly, the provider efficiency control system can help some providers consolidate time spent in an online status while also achieving similar earnings, if not better earnings than heretofore achieved under other systems.

Additional features and advantages of one or more embodiments of the present disclosure are outlined in the description which follows, and in part will be obvious from the description, or may be learned by the practice of such example embodiments.

Turning to the figures, FIG. 1 illustrates an example environment 100 for the provider efficiency control system 102 that can dynamically size or otherwise optimize a pool of available transportation providers for a geographic area in a dynamic transportation matching system 103. As used herein, the term "geographic area" can refer to a geohash (including any level of geohash like a geohash5, a geohash6, etc.) or any combination of multiple geohashes (e.g., a neighborhood or region comprising multiple geohashes). Further, as used herein, the term "optimal" or "optimize" should be interpreted to mean "improved," "enhanced" or "local optima," and not necessarily as "absolute optima," "true optimization" or the "best," although an "absolute optima" or "best" may still be covered by the present disclosure. For example, an optimization process may improve upon a solution that was there previously, may find the best solution, or may verify that an existing solution is a "local optima" or an "absolute optima" and thus should not be modified or changed.

As shown, in one or more embodiments, the provider efficiency control system 102 can be a component of the dynamic transportation matching system 103 implemented on one or more server(s) 104. In these or other embodiments, the provider efficiency control system 102 may perform one or more acts of the present disclosure described in conjunction with the dynamic transportation matching system 103. Additionally or alternatively, the dynamic transportation matching system 103 may perform one or more acts of the present disclosure described in conjunction with the provider efficiency control system 102. Furthermore, although FIG. 1 depicts the provider efficiency control system 102 and the dynamic transportation matching system 103 as distinct systems, the provider efficiency control system 102 can be implemented in whole or in part by the dynamic transportation matching system 103, and vice-versa. As further shown in FIG. 1, provider devices 105a-105n communicate with the provider efficiency control system 102 via a network 112.

In one or more embodiments, the network 112 shown in FIG. 1 may include one or more networks and may use one or more communication platforms or technologies suitable for transmitting data and/or communication signals. In one or more embodiments, the network 112 includes a cellular network. The network 112 can additionally include the Internet or World Wide Web. Additionally or alternatively, the network 112 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

FIG. 1 illustrates that the server(s) 104 includes the dynamic transportation matching system 103. In one or more embodiments, the dynamic transportation matching system 103 receives transportation match requests from a requestor computing device and provides a generated transportation match to a provider device 105a-105n and/or an associated vehicle via dynamic transportation matching applications 107a-107n. In particular, one or more of the dynamic transportation matching applications 107a-107n may be a web application, a native application installed on one or both of the provider device 105a-105n or a device physically integrated with a vehicle (e.g., a mobile application, a car interface application, a desktop application, etc.), or a cloud-based application where part of the functionality is performed by the server(s) 104. The dynamic transportation matching applications 107a-107n can present or display information to a provider, including digital content for accessing, receiving from, or sending information to one or both of the dynamic transportation matching system 103 or the provider efficiency control system 102. A vehicle associated with any of the provider devices 105a-105n can transport the requestor associated with the requestor computing device to a location specified in the transportation match request.

Figure 2:
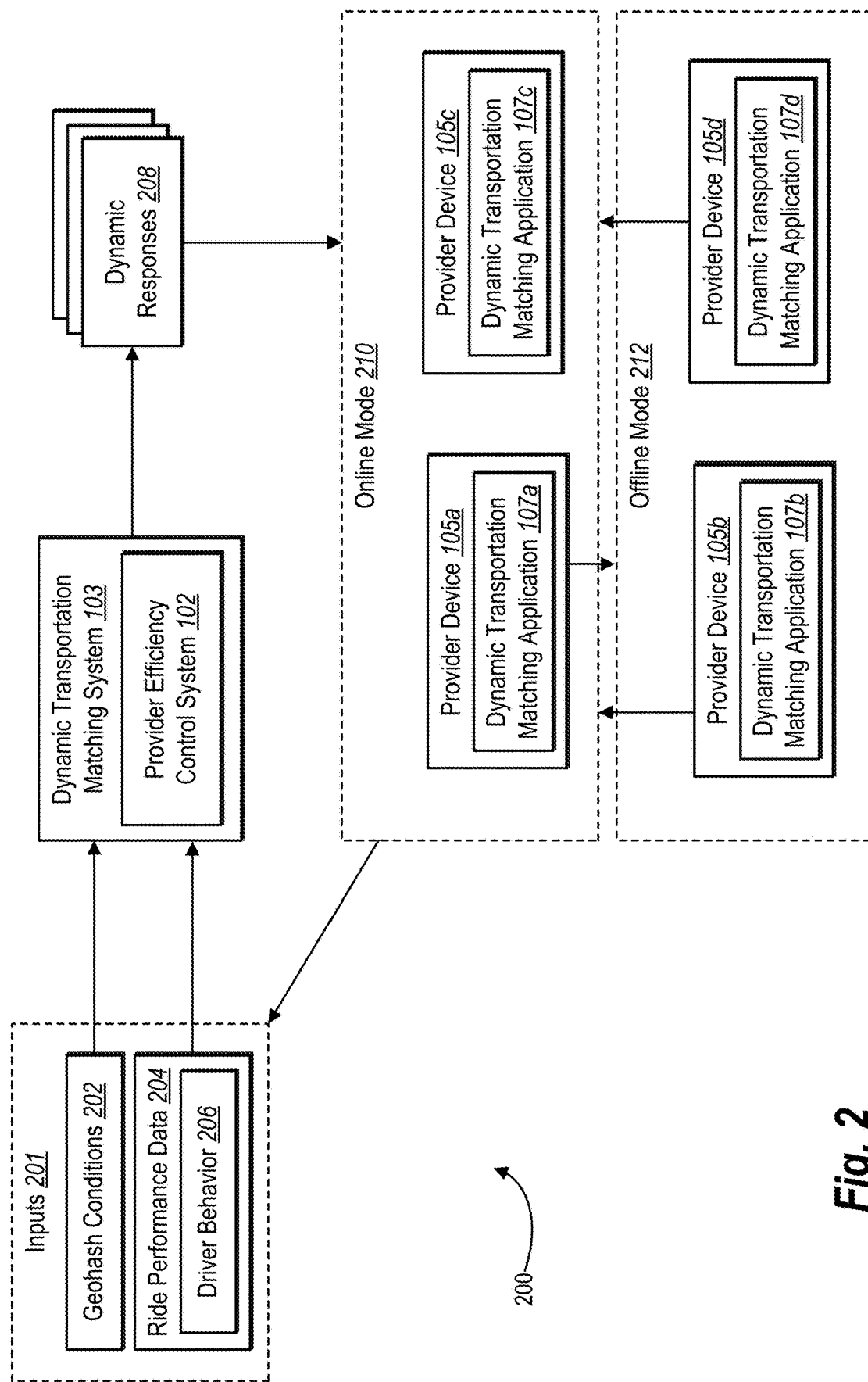
FIG. 2 illustrates a process flow of the provider efficiency control system regulating access to an online mode for a transportation matching system in accordance with one or more embodiments.

As mentioned above, the dynamic transportation matching system 103 includes the provider efficiency control system 102. FIG. 2 illustrates a process flow 200 for dynamically sizing a pool of available providers via the provider efficiency control system 102 to regulate access to the dynamic transportation matching system 103, arranged in accordance with one or more embodiments. As illustrated, the provider efficiency control system 102 obtains (e.g., by way of receiving, generating, determining, identifying, etc.) a set of inputs 201 and outputs one or more dynamic responses 208. Further illustrated, the provider efficiency control system 102 sends the dynamic responses 208 to one or more of the provider devices 105a-105n for selection and performance (e.g., by providers respectively associated with the provider devices 105a-105n). Based on the selection and performance (or non-selection/non-performance) of at least one of the dynamic responses 208, the provider efficiency control system 102 can regulate access to the dynamic transportation matching system 103. As example ways of regulating access to the dynamic transportation matching system 103, the provider efficiency control system 102 can cause the provider devices 105a-105n to toggle between and/or remain in an online mode 210 and an offline mode 212. In turn, such events and/or non-events associated with the provider devices 105a-105n affect the inputs 201.

In more detail, the process flow 200 illustrates the inputs 201 as including geohash conditions 202. In some embodiments, the geohash conditions 202 can include any data associated with one or more geographic areas. For example, the geohash conditions 202 can include a number of open transport requests, a number of matched transport requests, a number of completed transport requests, a forecast of transport requests, a queue of transport requests, a duration of open transport requests, etc. In another example, the geohash conditions 202 can include a number of online providers that are available to accept new matches to transportation requests (e.g., in idle) and/or are currently matched to a transportation request (e.g., en route to pickup or currently in service). Additionally or alternatively, the geohash conditions 202 can include a number of offline providers that are neither available to accept matches to transportation requests and are not currently matched to a transportation request.

In some embodiments, the geohash conditions 202 can include geohash boundary information and/or positional relationship data between two or more geohashes, including various combinations of geohashes. Further, the geohash conditions 202 can include any positional relationship data of any of the provider devices 105a-105n relative to each other, relative to one or more transport requests, relative to one or more geohashes, relative to external factors like current/forecasted traffic conditions and construction, etc. and/or relative to any combination thereof. For example, the geohash conditions 202 can include estimated time to arrival (ETA) metric data for any of the provider devices 105a-105n, in which the ETA is a predicted amount of time until a vehicle position associated with a provider device 105 arrives at a certain location or area (e.g., of a requestor associated with a transport request for pickup, a busy geohash with open transport requests, etc.).

In other examples, the geohash conditions 202 can include an assortment of metrics and data combinations. For instance, the geohash conditions 202 can include: a mean driver idle time in which a provider device is in the online mode 210 but not matched with a transportation request; a mean pickup time in which a provider device 105 takes to respond to a transport request; a mean service time in which a provider device 105 is associated with transporting a requestor; or any other suitable metric or derivative thereof. In these or other embodiments, one or more metrics comprising the geohash conditions 202 may be combined across any number of the provider devices 105a-105n and/or across one or more geohashes, and/or otherwise mathematically combined, smoothed, normalized, optimized, compared, predicted, etc.

FIG. 2 also illustrates the inputs 201 as including ride performance data 204. The ride performance data 204 can include any data relative to any of the provider devices 105a-105n. For example, the ride performance data 204 can include any of the metrics discussed above for the geohash conditions 202 that relate to the provider devices 105a-105n and/or a vehicle associated therewith (e.g., position, direction, speed, idle time, pickup time, service time, etc.). In these or other embodiments, the ride performance data 204 can include driver ratings and reviews, vehicle type, service category type (e.g., standard, premium, luxury, shared, shared saver, wheel-chair accessible, etc.), driver preferences, and/or any other suitable data.

Additionally, FIG. 2 illustrates the ride performance data 204 includes driver behavior 206. The driver behavior 206 can include any decisions, selections, patterns, and any information derivative therefrom as related to the provider devices 105a-105n and their associated providers. For example, the driver behavior 206 may include accepted transport requests, lapsed transport requests (i.e., gone unaccepted), cancelled transport requests (i.e., accepted and then aborted). Additionally or alternatively, the driver behavior 206 may include usual driving hours, routes, areas, and patterns of activity while in the online mode 210.

Based on the inputs 201, the provider efficiency control system 102 may determine to activate an online mode control condition to decrease a number of the provider devices 105a-105n that are in the online mode 210 in one or more geohashes. In response to activating the online mode control condition, the provider efficiency control system 102 generates the dynamic responses 208 for sending to one or more of the provider devices 105a-105n via the respective dynamic transportation applications 107a-107n. Responses to the dynamic responses 208 from the provider devices 105a-105n feed into the inputs 201 and can help the provider efficiency control system 102 determine in real-time how to allocate the provider devices 105a-105n between the online mode 210 and the offline mode 212 when the online mode control condition is active. Specifically, the dynamic responses 208 provide recommendations, instructions, selectable options, etc. that when followed guarantee or at least increase a likelihood of a provider device 105 staying in the online mode 210, if already there (e.g., the provider device 105c shown as an example in FIG. 2). On the other hand, those of the provider devices 105a-105n that fail to follow and/or perform at least one of the dynamic responses 208 switch from the online mode 210 to the offline mode 212 (e.g., the provider device 105a shown as another example in FIG. 2). Further, for those of the provider devices 105a-105n that are in the offline mode 212 when the provider efficiency control system 102 activates the online mode control condition, the dynamic responses 208 provide recommendations, instructions, selectable options, etc. that when followed guarantee or at least increase a likelihood of a provider device 105 of switching from the offline mode 212 to the online mode 210, albeit in some cases at a later point in time (e.g., the provider devices 105b, 105d shown as examples in FIG. 2).

In some embodiments, the provider efficiency control system 102 may send one or more of the dynamic responses 208 to a provider device 105 based on whether the provider device 105 is currently within the online mode 210 or the offline mode 212. For example, according to FIG. 2 the provider efficiency control system 102 may send to the provider devices 105b, 105d in the offline mode 212 some of the dynamic responses 208 that can include: relocating the respective vehicle positions associated with the provider devices 105b, 105d to a busier location; reserving a respective future time slot for the provider devices 105b, 105d to be in the online mode 210 at a particular geographic area; repeating a request to switch from the offline mode 212 to the online mode 210 at a later time (e.g., at a driving time recommended by the dynamic transportation matching system 103); requesting an availability notification from the provider efficiency control system 102 that notifies the provider devices 105b, 105d of a future availability to switch from the offline mode 212 to the online mode 210, or any other suitable dynamic response for switching to the online mode 210. In other embodiments, the dynamic responses 208 may include repurposing efforts to contribute to the dynamic transportation matching system 103 (e.g., collecting scooters, attending to maintenance service of a vehicle, etc.).

Similarly, to remain in the online mode 210, the provider efficiency control system 102 may send to the provider devices 105a, 105c in the online mode 210 some of the dynamic responses 208 that can include: accepting one or more of the next transportation requests received at the respective provider devices 105a, 105c, relocating the respective vehicle positions associated with the provider devices 105a, 105c to a busier location, or any other suitable dynamic response.

As mentioned above, the provider efficiency control system 102 can dynamically size a pool of available providers to decrease a number of the provider devices 105a-105n in the online mode 210. FIGS. 3-5B illustrate sequence diagrams illustrating acts involved in the process by which the provider efficiency control system 102 accomplishes these tasks, arranged in accordance with at least one embodiment of the present disclosure. While FIGS. 3-5B illustrate acts according to one embodiment, alternative embodiments may omit, add to, reorder, and/or modify any of the acts shown in FIGS. 3-5B. The acts of FIGS. 3-5B can be performed as part of a method. Alternatively, a non-transitory computer-readable medium can comprise instructions that, when executed by one or more processors, cause a computing device to perform the acts of FIGS. 3-5B. In some embodiments, a system can perform the acts of FIGS. 3-5B.

Figure 3:
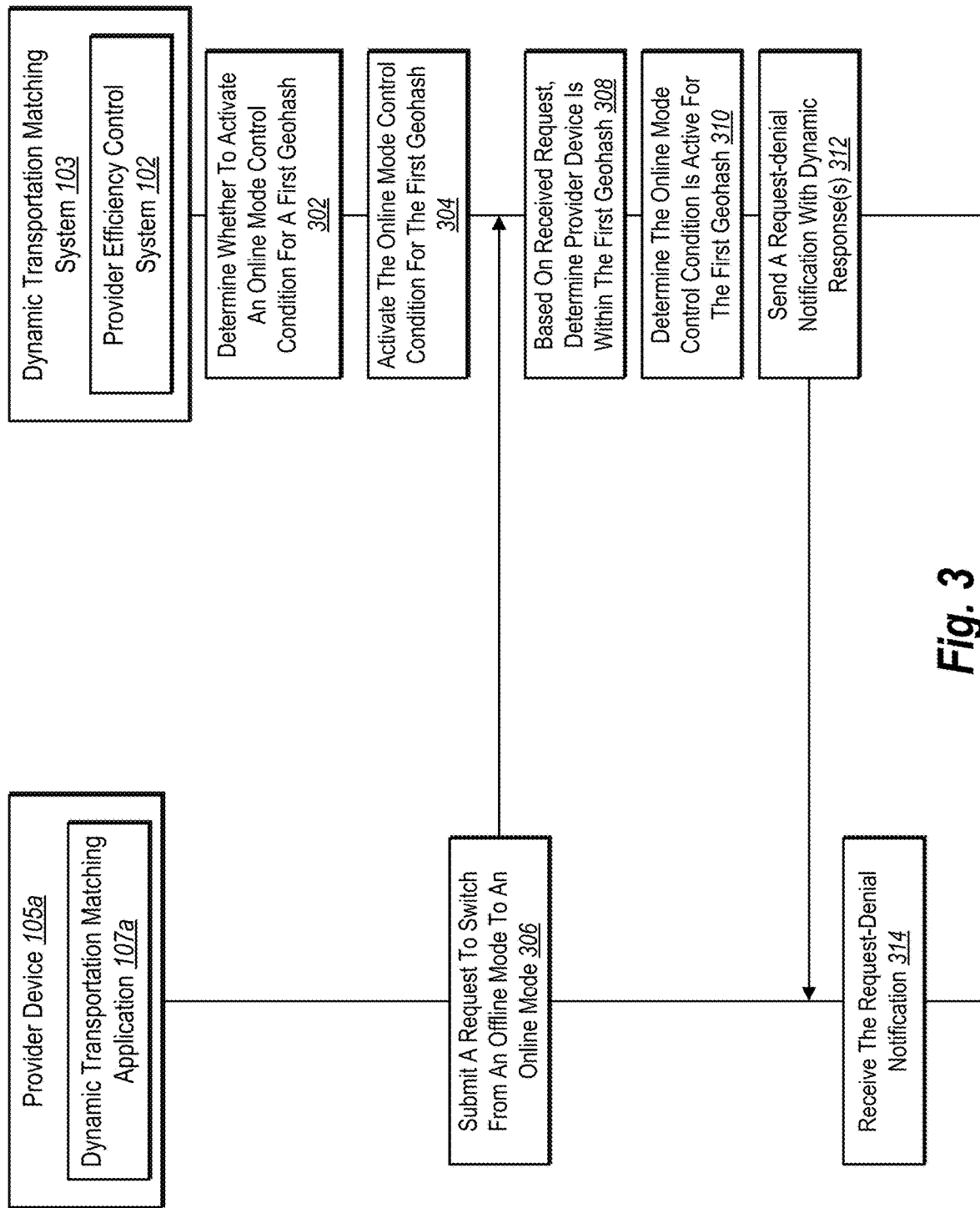
FIG. 3 illustrates a sequence diagram of the provider efficiency control system regulating access to an online mode for a transportation matching system in accordance with one or more embodiments.

In particular, FIG. 3 illustrates a sequence diagram with acts by which the provider efficiency control system 102 prohibits providers in the offline mode from switching to the online mode. As illustrated in FIG. 3, a sequence begins at act 302 when the provider efficiency control system 102 determines whether to activate an online mode control condition for a first geohash. In some embodiments, determining whether to activate the online mode control condition at act 302 includes analysis of various factors.

As one example factor analyzed at act 302, the provider efficiency control system 102 analyzes a provider efficiency parameter for the first geohash to determine if within a target range. The provider efficiency parameter as referred to herein includes a ratio of mean idle time ("P1") to mean pickup time ("P2"), which can be expressed as:

$$\frac{P1}{P2} = \epsilon,$$

where $\epsilon$ refers to the elasticity of an ETA function. In other terms, the provider efficiency parameter describes the percentage change in ETA for a 1% change in P1. In some cases, an efficient P1/P2 level can be in the range of about 0.2 to about 0.4, though other ranges are herein contemplated. When P1/P2 drops below the efficient level, there are fewer idle P1 providers, but the P2 time for pickups increases and providers spend more time driving to pick up passengers, so much so that the sum of P1 and P2 providers increases. Alternatively, when P1/P2 increases above the efficient level, there are more idle P1 providers, and P2 pick up times decrease. In this case, the sum of P1 and P2 providers again increases relative to the efficient level because of the excess P1 providers.

In some embodiments, P1 and P2 can be measured as the time-average number of providers in each state (P1 or P2) per geohash. In this sense, the measurements can represent a time-average density of providers in each state, where the unit of area is a geohash. References to the P1 and P2 measures as P1 density and P2 density are also acceptable.

To determine the P1 and P2 densities, the provider efficiency control system 102 can use geo-aggregation and kernel smoothing techniques. Specifically, the P1 and P2 densities can be measured over a geohash neighborhood using the existing geohash boundaries and definitions together with kernel smoothing weights based on ETA to convert geohash counts to neighborhood densities. Further, the P1 and P2 densities can be measured at intervals (e.g., every minute) for one or more geohashes. In some embodiments, the P1 and P2 densities can include sub-categories of data, like different ride types (e.g., standard, wheel-chair accessible, premium, luxury, etc.).

Additionally or alternatively, P1 and P2 can be measured in a variety of ways. As one example way, the provider efficiency control system 102 can take a count of P1 and P2 minutes in a geohash over a given observation interval (e.g., ten seconds, thirty seconds, one minute, etc.). This approach can be referred to as a count-based average. As another example way to measure P1 and P2, the provider efficiency control system 102 can identify the number of providers dispatched to a geohash and measure surplus providers in the same geohash.

With the raw data points of P1 and P2 densities measured, the provider efficiency control system 102 performs a time-smoothing algorithm in some embodiments. For example, let $\hat{R}(t)$ denote the P1/P2 ratio metric for a given geo g in minute t. To simplify notation, the geo index is emitted in the expressions that follow. Letting P1(t) and P2(t) denote the raw count of P1 and P2 densities in a geohash in a given minute t. Then the smoothed P1 and P2 density metrics can be represented by the exponential smoothing process:

$$\hat{P}1(t) = \alpha P1(t) + (1-\alpha)\hat{P}1(t-1)$$

$$\hat{P}2(t) = \alpha P2(t) + (1-\alpha)\hat{P}2(t-1)$$

The smoothing constant α is chosen to balance smoothness versus lag in the P1/P2 ratio signal. If time is measured in minutes, then a value of α=0.2 can correspond roughly to averaging the ratio over a five minute interval. Smaller values of the smoothing constant may result in a less volatile metric but one that might be slower to track changes in the P1 and P2 density.

The provider efficiency control system 102 may then use the smoothed P1 and P2 densities to generate an estimate of the provider efficiency parameter, denoted $\hat{R}(t)$, by simply taking the ratio expressed as follows:

$$\hat{R}(t) = \frac{\hat{P}1(t)}{\hat{P}2(t)}$$

The individual P1 and P2 smoothed density estimates can also be used to generate a "slot limit" referring to a number of drivers that can be permitted in the online mode 210.

Once the provider efficiency control system 102 determines the P1/P2 ratio metric $\hat{R}(t)$, the provider efficiency control system 102 may determine to activate the online mode control condition if:

$$\hat{R}(t) > \overline{R},$$

where the threshold $\overline{R}$ may be based on an absolute target level for the P1/P2 ratio (e.g. 2.0) or on the basis of density of activity. Alternatively, the provider efficiency control system 102 may use a safety factor to account for volatility in the provider efficiency parameter. Specifically, since the P1/P2 ratio can be noisy, especially in sparse areas, the provider efficiency control system 102 may account for the variance of the P1/P2 ratio as well as the mean. This can be achieved by tracking the second moment of the ratio and then producing an exponentially smoothed second moment estimate to generate the standard deviation of the P1/P2 ratio:

$$\hat{\sigma}_R(T) = \sqrt{\hat{R}^2(t) - [\hat{R}(t)]^2}$$

Accordingly, modifying relative to the above logic rule, the provider efficiency control system 102 can determine to activate the online mode control condition if:

$$\hat{R}(t) > \overline{R} + k\hat{\sigma}_R(t),$$

where k≥0 is a safety factor (i.e., a number of standard deviations above the target threshold).

Further, the provider efficiency control system 102 can provide additional control layers for determining whether the provider efficiency parameter is within a target range. For example, the provider efficiency control system 102 may implement hysteresis logic for determining whether to activate or deactivate the online mode control condition, (e.g., using a lower threshold $\underline{R} < \overline{R}$ for the provider efficiency ratio threshold).

Additionally, the provider efficiency control system 102 at act 302 analyzes another factor that includes an ETA metric in determining whether to activate the online mode control condition. For example, the provider efficiency control system 102 may determine to activate the online mode control condition if the following ETA metric is within some upper limit of ETA (e.g., five minutes). Specifically, if E(t) is the raw ETA measurement in a given neighborhood in minute t and $\hat{E}(t)$ is the ETA metric, then the follow expression can apply:

$$\hat{E}(t) = \alpha E(t) + (1-\alpha)\hat{E}(t-1)$$

In some cases, the provider efficiency control system 102 may determine to not activate (or deactivate) the online mode control condition if the ETA metric exceeds the upper limit, even if the provider efficiency parameter has exceeded its upper bound of the target range. In this manner, the provider efficiency control system 102 uses the ETA metric to ensure service levels are not negatively impacted in a significant way, and therefore, in some cases may be prioritized over a better provider efficiency ratio.

Further, the provider efficiency control system 102 at act 302 analyzes another factor that includes a prime-time status in determining whether to activate the online mode control condition. In particular, the provider efficiency control system 102 may determine not to activate the online mode control condition if the level of primetime in the geohash exceeds a threshold (e.g., is positive or is otherwise active). As used herein, the term "primetime" refers to a period of time designated as distinct from other periods of time in which riders may submit transport requests. In particular, primetime refers to a period of time in which the number of transport requests is greater than the number of providers available to fulfill the transport requests. For example, a period of time encapsulating the time leading up to or immediately after a special event, such as a convention or a sporting event, may be designated as primetime if the number of attendees requesting a ride is larger than the number of providers in the area in the online mode 210.

Thus, in some embodiments, the provider efficiency control system 102 may determine at act 302 to activate the online mode control condition if: primetime is not active, if the ETA metric is within bounds, and the provider efficiency parameter (P1/P2) is above the target range. This example logic implemented by the provider efficiency control system 102 is also represented in the following example pseudo-code:

```
If                                                          #decide whether to activate
    dispatch_control_status_active == FALSE and \           #dispatch controls not active
    PT_active == FALSE and \                                #PT is not active
    Ê(t) < E̅ and \                                          #ETA metric is within bound
    R̂(t) > R̅ + kσ̂_R(t) \                                    #P1/P2 ratio above bound
    and PT(t) = 0:                                          # no PrimeTime
        dispatch_control_status_active = TRUE
elseif                                                      #decide whether to deactivate
    dispatch_control_status_active == TRUE and \            #dispatch controls active
    (PT_active == TRUE or \                                 #PT is active
    Ê(t) > E̅ or \                                           #ETA metric exceeds bound
    R̂(t) < R̲ + kσ̂_R(t) ) :                                  #P1/P2 ratio below bound
        dispatch_control_status_active = FALSE
```

At act 304, the provider efficiency control system 102 activates the online mode control condition for the first geohash. For example, in response to one or more determinations at act 302, the provider efficiency control system 102 activates the online mode control condition.

Further, in some embodiments, the provider efficiency control system 102 at act 304 determines for the first geohash a number of online mode slots that correspond to a number of the provider devices 105a-105n that can be in the online mode 210 in the first geohash under the active online mode control condition and according to real-time conditions (e.g., the inputs 201). In these or other embodiments, the provider efficiency control system 102 determines one or more slot limits for online mode slots, including for the first geohash, to regulate in real-time increases or decreases in the number of transport requests.

To determine the number of online mode slots available for the first geohash, the provider efficiency control system 102 may first determine a total number of the provider devices 105a-105n that the provider efficiency control system 102 can allow in the online mode 210 across a group of geohashes or a region, represented as the total slot limit y in the following expression:

$$y = TS(\theta^*) - TS(1) = \hat{P}1(t)\left(\theta^* - 1 - \frac{1 - \theta^{*-\epsilon}}{\hat{R}(t)}\right),$$

where the right-hand side includes: the smoothed P1 density $\hat{P}1(t)$ described above as a function of time t, $\hat{R}(t)$ representing the provider efficiency parameter described above as a function of time t, $\epsilon$ representing the elasticity of the ETA function, and $\theta^*$ representing a value $\theta^* > 1$ such that if the number of providers is scaled by this value, $R(\theta^*) = \overline{R}$, otherwise expressed as $$\theta^* = \left(\frac{\overline{R}}{\hat{R}(t)}\right)^{\frac{1}{1+\epsilon}},$$

where $\overline{R}$ is the provider efficiency parameter threshold also described above.

Once the provider efficiency control system 102 determines the total number of the provider devices 105a-105n that are able to be in the online mode 210 for a region, the provider efficiency control system 102 can then determine how the total number of the provider devices 105a-105n translates to a local level (e.g., a geohash level). To do so, the provider efficiency control system 102 solves the following linear system for the vector x:

$$\begin{bmatrix} w_{11} & w_{12} & w_{1n} \\ w_{21} & w_{22} & w_{2n} \\ \cdots & & \\ w_{n1} & w_{n2} & w_{nn} \end{bmatrix} \begin{bmatrix} x_1 \\ x_2 \\ \cdots \\ x_n \end{bmatrix} = \begin{bmatrix} y_1 \\ y_2 \\ \cdots \\ y_n \end{bmatrix},$$

or in matrix form: Wx=y, where $x_i$ represents a local slot limit for geohash i; $y_i$ represents a neighborhood slot limit for the neighborhood centered around geohash i; and $w_{ij}$ represents a weight (e.g., a kernel smoothing coefficient) of geohash i that contributes to neighborhood j. Additionally or alternatively, the provider efficiency control system 102 may solve for the vector x using a least squares problem expressed, for example, as follows:

$$\min_{x \geq 0} \|y - Wx\|^2$$

In some embodiments, however, the local slot limit can have a greater impact to the inputs 201 than may be initially expected. For example, a single provider can often amount to a large unit of supply and impacts density over a wider neighborhood around their respective geohash. Accordingly, the provider efficiency control system 102 can make real-time adjustments to the number of providers admitted into the online mode 210 using the following example expression. Let $\mathcal{N}(j)$ denote the set of geohashes in a neighborhood region of geohashes j. Then the updated number of additional providers that the provider efficiency control system 102 may allow in the online mode 210 in j is the sum of local slot limits in j, denoted as follows:

$$L(j) = \sum_{i \in \mathcal{N}(j)} x_i$$

Further, the provider efficiency control system 102 can make additional adjustments on the fly after adding each new provider into the online mode 210. For example, each new provider admitted into the online mode 210 in the neighborhood region of geohashes j can reduce the allocations of providers according to the expression: $x \leftarrow x - w_j$, where $w_j = (w_{1j}, w_{2j}, \ldots, w_{nj})$ is the j-th row of the kernel weight matrix W. The Provider Efficiency control system 102 can perform this updated process iteratively until new slot limits x are recalculated after updating the P1 and P2 density metrics. Additionally or alternatively, the provider efficiency control system 102 may aggregate the local slot limits x in other ways to communicate or selectively restrict providers from switching to the online mode 210. For example, the provider efficiency control system 102 may aggregate the geohash local slot limits over other types of geohash zones to produce corresponding zonal slot limits.

Additionally or alternatively to determining slot limits, in some embodiments, the provider efficiency control system 102 may forecast how many providers will be needed in a given geographic area based on a forecast. For example, the provider efficiency control system 102 may predict or otherwise generate a static forecast of the number of needed providers based on historical data of needed providers (e.g., by geographic area) and current date/time information.

In some embodiments, the provider efficiency control system 102 may set a priority for filling the available slots within the online mode 210, and in turn, a priority for notifying (i.e., transmitting a notification to) one or more of the provider devices 105a-105n that can switch to the online mode 210. For example, the provider efficiency control system 102 may prioritize filling available slots within the online mode 210 and/or notifying one or more of the provider devices 105a-105n based on an acceptance rate of ride assignments (e.g., an acceptance rate of ninety percent or above), a number of completed rides within a given time period (e.g., at least one hundred completed rides in thirty days), a provider rating (e.g., 4.85+), a queue position (e.g., a wait time for switching to the online mode 210), a proximity to where the transport requests begin and/or end (e.g., a pickup/drop-off location), and/or a ride type (e.g., standard, wheel-chair accessible, premium, luxury, shared, shared saver, etc.)

At act 306, the provider efficiency control system 102 receives a request submitted from the provider device 105a via the dynamic transportation matching application 107a to switch from the offline mode 212 to the online mode 210. For example, the provider may be starting out for the day and opens the dynamic transportation matching application 107a to go into the online mode 210. As another example, the provider efficiency control system 102 may have recently switched the provider from the online mode 210 to the offline mode 212, and the provider now wishes to switch back to the online mode 210. In these or other embodiments, the request to switch from the offline mode 212 to the online mode 210 may include opening the dynamic transportation matching application 107a, which pings the provider efficiency control system 102. Additionally or alternatively, the request to switch from the offline mode 212 to the online mode 210 may include receiving the request to switch in response to a user input at the dynamic transportation matching application 107a (e.g., a selected button, interface touch gesture, voice command, etc.). In these or other embodiments, the request to switch may include metadata indicative of one or more aspects of the ride performance data 204 and the driver behavior 206, such as current location/geohash, direction, speed, destination.

At act 308, the provider efficiency control system 102 determines the provider device 105a is within the first geohash based on the received request to switch from the offline mode 212 to the online mode 210. For example, using the metadata associated with the request, the provider efficiency control system 102 may determine the provider device 105a is within the first geohash.

At act 310, the provider efficiency control system 102 determines the online mode control condition is active for the first geohash. For example, the provider efficiency control system 102 can identify that the current logic condition for the provider efficiency control system 102 includes the online mode control condition is still active. Additionally or alternatively, the provider efficiency control system 102 may rerun one or more logic rules described above with respect to act 302 to determine that the online mode control condition for the first geohash is still properly instated according to the steps and algorithms outlined in act 302.

At act 312, the provider efficiency control system 102 sends a request-denial notification with one or more of the dynamic responses 208 to the provider device 105a via the dynamic transportation matching application 107a. The request-denial notification may include digital content that when displayed at the dynamic transportation matching application 107a indicates to the provider a current inability to switch the provider device 105a from the offline mode 212 to the online mode 210 and/or a reason for the request-denial notification (e.g., too many providers in the currently-located geohash, too few transportation requests in the currently-located geohash, etc.).

At act 314, the provider device 105a receives the request-denial notification along with one or more of the dynamic responses 208 via the dynamic transportation matching application 107a. To switch, or at least increase a likelihood of switching from the offline mode 212 to the online mode 210, the provider may choose to select one or more of the dynamic responses 208 displayed at the dynamic transportation matching application 107a.

For example, the provider efficiency control system 102 may cause to display at the dynamic transportation matching application 107a some of the dynamic responses 208 that can include: relocating the vehicle position associated with the provider device 105a to a busier location; reserving a future time slot for the provider device 105a to be in the online mode 210 at a particular geographic area; repeating a request to switch from the offline mode 212 to the online mode 210 at a later time (e.g., at a driving time recommended by the dynamic transportation matching system 103); requesting an availability notification from the provider efficiency control system 102 that notifies the provider device 105a of a future availability to switch from the offline mode 212 to the online mode 210, using exemption tokens (described later in this disclosure), and/or any other suitable dynamic response for switching to the online mode 210. In other embodiments, the dynamic responses 208 may include repurposing efforts to contribute to the dynamic transportation matching system 103 (e.g., collecting scooters, attending to maintenance service of a vehicle, etc.).

Figure 4A:
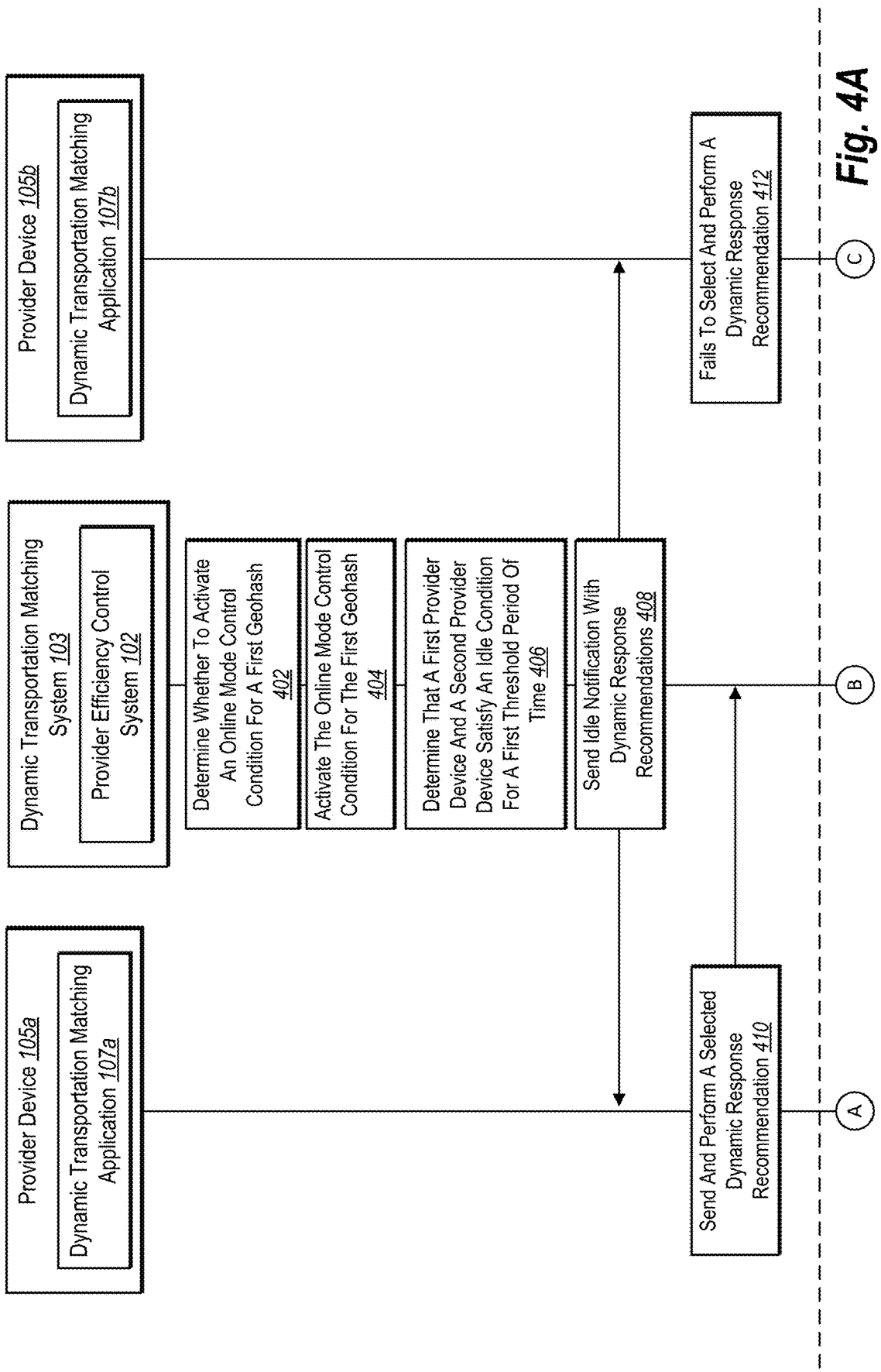

As mentioned above, the provider efficiency control system 102 can dynamically size a pool of available providers to decrease a number of the provider devices 105a-105n in the online mode 210. FIGS. 4A-4B illustrate sequence diagrams illustrating acts involved in the process by which the provider efficiency control system 102 accomplishes these tasks, arranged in accordance with at least one embodiment of the present disclosure. FIGS. 4A-4B in particular relate to scenarios in which the provider efficiency control system 102 reduces a number of the provider devices 105a-105n in the online mode 210 because of too few transportation requests in a geohash and/or too many providers in the geohash. The sequence begins at act 402 and 404, which are the same as or similar to the respective acts 302 and 304 described above in conjunction with FIG. 3.

At act 406, the provider efficiency control system 102 determines that a first provider device (in this example, provider device 105a) and a second provider device (in this example, provider device 105b) satisfy an idle condition for a first threshold period of time. As mentioned above, the idle condition refers to P1 time, and therefore, the provider device 105a and the provider device 105b are associated with a designation as P1 providers because they are in the online mode 210 but are idling (i.e., not matched with a transportation request). In some embodiments, the idle condition begins at the end of fulfilling a transportation request (e.g., at drop-off, upon selection of an "end trip" button, etc.). Additionally or alternatively, the idle condition can be measured from the time of the last "accept" screen presented at the dynamic transportation matching application 107.

Furthermore, thresholds of the idle condition can be consecutive time periods in which the provider devices 105a-105n are in the idle condition. For example, the first threshold period of time may include ten consecutive minutes, thirty consecutive minutes, sixty consecutive minutes, ninety consecutive minutes, etc. Alternatively, the thresholds of the idle condition can be accumulated time periods over a predefined interval in which the provider devices 105a-105n are in the idle condition. Accordingly, in some embodiments, the first threshold period of time may, for example, include an aggregated two hours in the idle condition for a consecutive four-hour period of time, an aggregated three hours in the idle condition for a consecutive five-hour period of time, etc. Accordingly, a variety of ways of determining the first threshold are herein contemplated.

At act 408, the provider efficiency control system 102 sends an idle notification with one or more dynamic response recommendations to the provider devices 105a, 105b via the respective dynamic transportation matching applications 107a, 107b. The idle notification may include digital content that, when displayed at the dynamic transportation matching applications 107a, 107b, indicates to the respective providers the possibility that the provider efficiency control system 102 may switch their provider device from the online mode 210 to the offline mode 212. Additionally or alternatively, the idle notification may include digital content explaining why the provider efficiency control system 102 may switch their provider device from the online mode 210 to the offline mode 212 (e.g., too many providers in the currently-located geohash, too few transportation requests in the currently-located geohash, etc.).

In some embodiments, the provider efficiency control system 102 may cause to display the idle notification at the dynamic transportation matching applications 107a, 107b with some of the dynamic response recommendations that can include, for example: driving to a busier area, relocating a vehicle position associated with the provider devices 105a, 105b to another geohash, reserving a future time slot for the provider devices 105a, 105b to be guaranteed in the online mode 210 for a particular geographic area; using exemption tokens (described later in this disclosure), driving at a time and/or place recommended by the dynamic transportation matching system 103; requesting an availability notification from the provider efficiency control system 102 that notifies the provider devices 105a, 105b of a future availability to switch from the offline mode 212 to the online mode 210, and/or any other suitable dynamic response for remaining in the online mode 210 or later switching back to the online mode 210 from the offline mode 212. In other embodiments, the dynamic response recommendations may include repurposing efforts to contribute to the dynamic transportation matching system 103 (e.g., collecting scooters, attending to maintenance service of a vehicle, etc.).

At act 410, the provider device 105a sends, via the dynamic transportation matching application 107a, at least one of the dynamic response recommendations and/or indicates performance of at least one of the dynamic response recommendations. For example, the provider device 105a may begin to proceed towards a recommended driving area, request navigation to a certain busy geohash, redeem exemption tokens, etc. As referred to herein, "exemption tokens" or "tokens" can exempt a provider device from restrictions set according to the online mode control condition. For example, a token associated with the provider device permits a time-based or use-based exemption period from the online mode control condition such that the provider device can toggle between the online mode and the offline mode without restriction during the exemption period. In these or other embodiments, the provider efficiency control system 102 may selectively associate tokens with the provider devices 105a-105n for use during an active online mode control condition. For example, the provider efficiency control system 102 may selectively associate tokens with the provider devices 105a-105n according to a reward system, a loyalty system, a bonus system, a retention system, etc. Additionally or alternatively, the provider efficiency control system 102 can consider other types of exemption to the active online mode control condition. For example, an initial amount of time (e.g., the first thirty minutes, hour, two hours, etc.) in the online mode 210 for any of the provider devices 105a-105n may be exempt from the idle condition.

At act 412, the provider device 105b fails to select and/or indicate performance at least one of the dynamic response recommendations sent from the provider efficiency control system 102.

At act 414, the provider efficiency control system 102 determines for the provider device 105a, performance of the at least one dynamic response recommendation. For example, the provider efficiency control system 102 may receive the selection of the dynamic response recommendation (e.g., requesting navigation assistance to a busy geohash or hotspot). Additionally or alternatively, the provider efficiency control system 102 may receive one or more updated inputs 201 that indicate the user is attempting to navigate to another geohash (e.g., based on vehicle position associated with the provider device 105a).

At act 416, in response to the determination at act 414, the provider efficiency control system 102 permits the provider device 105a to remain in the online mode 210 such that the dynamic transportation matching system 103 and/or the provider efficiency control system 102 can send a transportation request matched to the provider device 105a, which ends the idle condition for the provider device 105a.

At act 418, in response to act 412, the provider efficiency control system 102 determines for the provider device 105b a condition of non-performance of a dynamic response recommendation. In particular, the provider efficiency control system 102 determines that the 105b fails to perform at least one dynamic response recommendation for a period of time satisfying a second threshold period of time. The second threshold period of time can be consecutive time periods in which the provider devices 105a-105b is in the idle condition. For example, the second threshold period of time may include thirty consecutive minutes, sixty consecutive minutes, ninety consecutive minutes, one hundred twenty consecutive minutes, etc. Alternatively, the thresholds of the idle condition can be accumulated time periods over a predefined interval in which the provider devices 105a-105b is in the idle condition. Accordingly, in some embodiments, the second threshold period of time may, for example, include an aggregated two hours in the idle condition for a consecutive four-hour period of time, an aggregated three hours in the idle condition for a consecutive five-hour period of time, etc. Accordingly, a variety of ways of determining the second threshold (including different ways from the first threshold) are herein contemplated.

At act 420, the provider efficiency control system 102 in response to the determination at act 418 switches the provider device 105b to the offline mode 212. At act 422, the provider efficiency control system 102 sends an offline notification to the provider device 105b via the dynamic transportation matching application 107b. In some embodiments, the offline notification may include digital content that when displayed at the dynamic transportation matching application 107b indicates to the provider a current status of the offline mode 212 and/or a reason for the offline notification (e.g., too many providers in the currently-located geohash, too few transportation requests in the currently-located geohash, etc.).

Figure 5A:
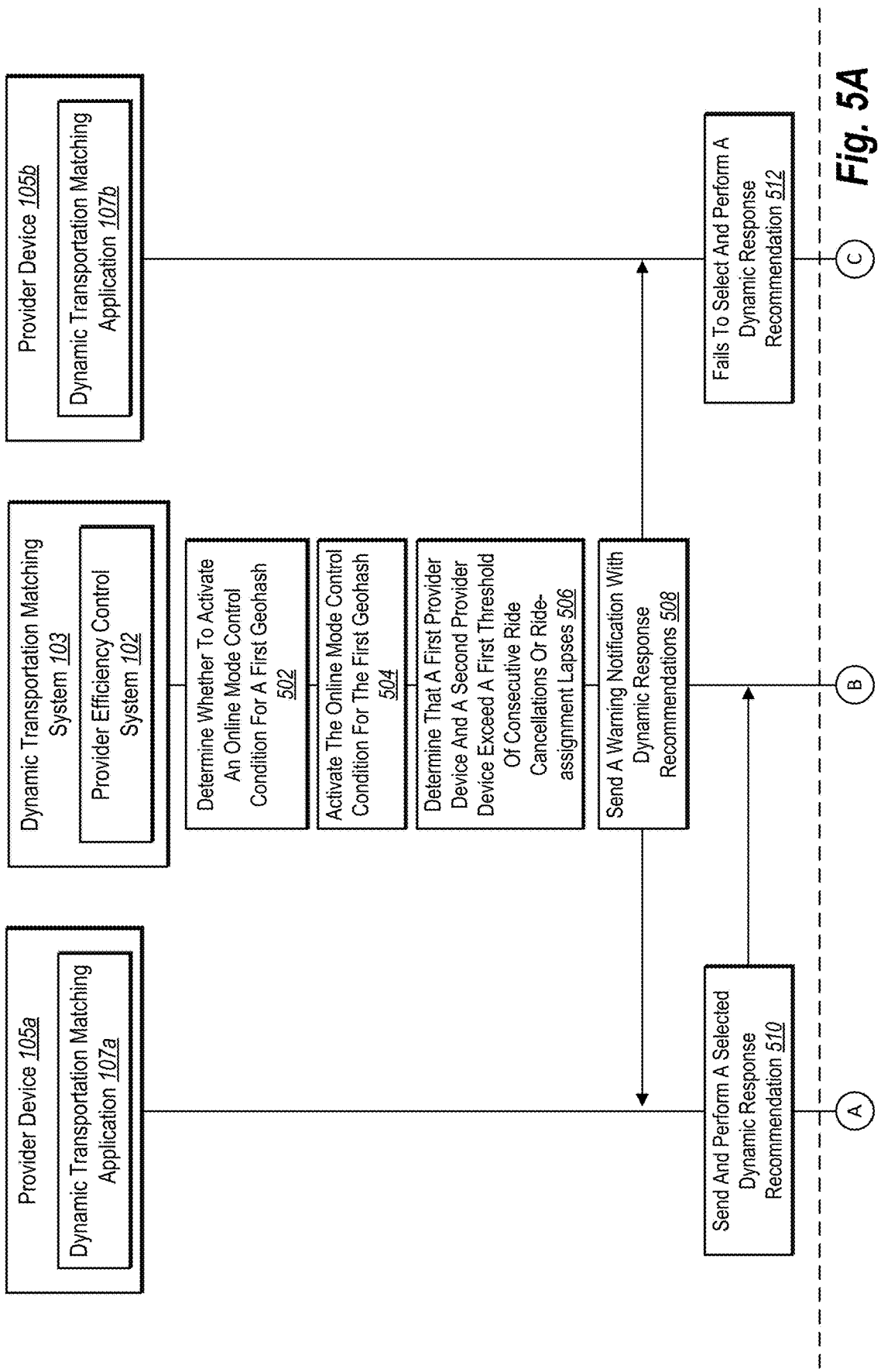
FIGS. 5A-5B illustrate additional sequence diagrams of the provider efficiency control system regulating access to an online mode for a transportation matching system in accordance with one or more embodiments.
Figure 5B:
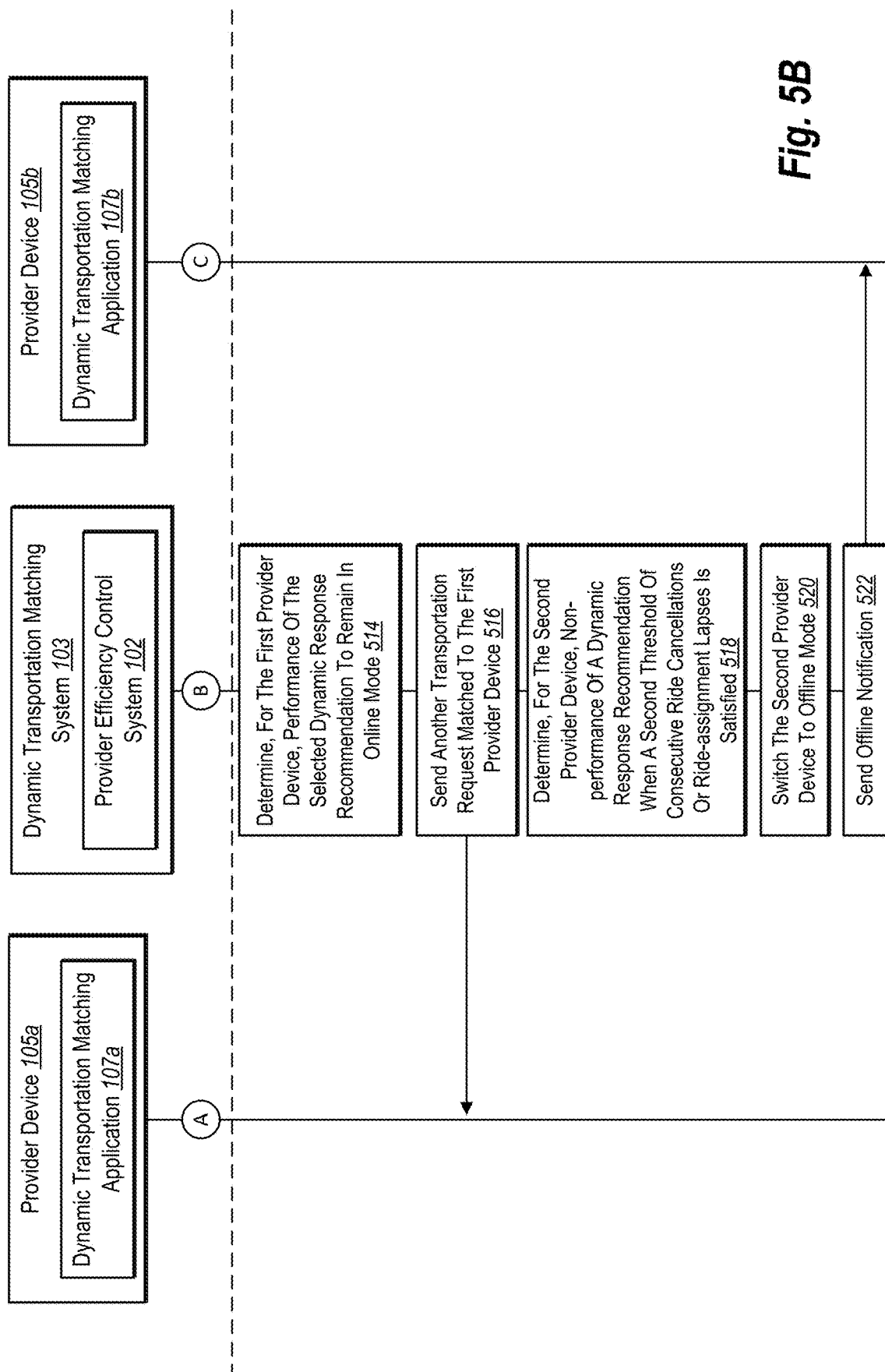

As mentioned above, the provider efficiency control system 102 can dynamically size a pool of available providers to decrease a number of the provider devices 105a-105n in the online mode 210. FIGS. 5A-5B illustrate sequence diagrams illustrating acts involved in the process by which the provider efficiency control system 102 accomplishes these tasks, arranged in accordance with at least one embodiment of the present disclosure. FIGS. 5A-5B in particular relate to scenarios in which the provider efficiency control system 102 reduces a number of the provider devices 105a-105n in the online mode 210 because of too many lapsed or cancelled transportation requests. The sequence begins at act 502 and 504, which are the same as or similar to the respective acts 302 and 304 described above in conjunction with FIG. 3.

At act 506, the provider efficiency control system 102 determines that a first vehicle (e.g., the provider device 105a) and a second vehicle (e.g., the provider device 105b) have exceeded a first threshold of consecutive ride cancellations or ride-assignment lapses. As referred to herein, the terms "cancellation" or "ride cancellation" refer to a transport request that a provider device accepts and subsequently aborts. Additionally, as referred to herein, the terms "lapse" or "ride-assignment lapse" refer to a transport request sent to the provider device for acceptance, to which the provider device does not indicate a response or otherwise denies acceptance.

Furthermore, thresholds of ride cancellations or ride-assignment lapses can account for scenarios involving ride cancellations only, ride-assignment lapses only, or a combination of ride cancellations and ride-assignment lapses. Thus, in some embodiments, the first threshold may include any of the following examples or other potential examples: one cancellation or lapse, two cancellations, one lapse and one cancellation, two lapses, two lapses and one cancellation, two cancellations and one lapse, three lapses, three cancellations, and so forth. In other embodiments, the first threshold of ride cancellations or ride-assignment lapses is not necessarily consecutive in nature. For example, the provider efficiency control system 102 may set the first threshold of ride cancellations or ride-assignment lapses as an aggregate number of ride cancellations or ride-assignment lapses over a period of time. Accordingly, a variety of ways of determining the first threshold of ride cancellations or ride-lapses are herein contemplated.

At act 508, the provider efficiency control system 102 sends a warning notification with one or more dynamic response recommendations to the provider devices 105a, 105b via the respective dynamic transportation matching applications 107a, 107b. The warning notification may include digital content that, when displayed at the dynamic transportation matching applications 107a, 107b, indicates to the respective providers the possibility that the provider efficiency control system 102 may switch their provider device from the online mode 210 to the offline mode 212. Additionally or alternatively, the warning notification may include digital content explaining why the provider efficiency control system 102 may switch their provider device from the online mode 210 to the offline mode 212 (e.g., too many ride cancellations or too many ride-lapses).

In some embodiments, the provider efficiency control system 102 may cause to display the warning notification at the dynamic transportation matching applications 107a, 107b with some of the dynamic response recommendations that can include, for example: accepting and completing one or more of the next few ride assignments, relocating a vehicle position for the provider devices 105a, 105b to another geohash, reserving a future time slot for the provider devices 105a, 105b to be guaranteed in the online mode 210 for a particular geographic area; using exemption tokens, driving at a time and/or place recommended by the dynamic transportation matching system 103; requesting an availability notification from the provider efficiency control system 102 that notifies the provider devices 105a, 105b of a future availability to switch from the offline mode 212 to the online mode 210, and/or any other suitable dynamic response for remaining in the online mode 210 or later switching back to the online mode 210 from the offline mode 212. In other embodiments, the dynamic response recommendations may include repurposing efforts to contribute to the dynamic transportation matching system 103 (e.g., collecting scooters, attending to maintenance service of a vehicle, etc.).

At act 510, the provider device 105a sends, via the dynamic transportation matching application 107a, at least one of the dynamic response recommendations and/or performs at least one of the dynamic response recommendations. For example, the provider device 105a may indicate acceptance and completion of the next transportation request, begin to proceed towards a recommended driving area, request navigation to a certain busy geohash, redeem exemption tokens, etc.

At act 512, the provider device 105b fails to select and/or indicate performance of at least one of the dynamic response recommendations sent from the provider efficiency control system 102.

At act 514, the provider efficiency control system 102 determines for the provider device 105a, performance of the at least one dynamic response recommendation. For example, the provider efficiency control system 102 may receive the selection of the dynamic response recommendation (e.g., accepting the next ride assignment, requesting navigation assistance to a busy geohash or hotspot, etc.). Additionally or alternatively, the provider efficiency control system 102 may receive one or more updated inputs 201 that indicate the user is en route with the requestor to a drop-off point for the accepted transport request (e.g., based on vehicle position associated with the provider device 105a).

At act 516, in response to the determination at act 514, the provider efficiency control system 102 permits the provider device 105a to remain in the online mode 210 such that the dynamic transportation matching system 103 and/or the provider efficiency control system 102 can send another transportation request matched to the provider device 105a.

At act 518, in response to act 512, the provider efficiency control system 102 determines for the provider device 105b a condition of non-performance of a dynamic response recommendation. In particular, the provider efficiency control system 102 determines that the provider device 105b fails to indicate performance of at least one dynamic response recommendation such that the provider device 105b satisfies a second threshold of ride cancellations or ride-assignment lapses. The second threshold of ride cancellations or ride-assignment lapses may include any of the following examples or other potential examples: two cancellations, one lapse and one cancellation, two lapses, two lapses and one cancellation, two cancellations and one lapse, three lapses, three cancellations, four lapses, two cancellations and two lapses, and so forth. In other embodiments, the second threshold of ride cancellations or ride-assignment lapses is not necessarily consecutive in nature. For example, the provider efficiency control system 102 may set the second threshold of ride cancellations or ride-assignment lapses as an aggregate number of ride cancellations or ride-assignment lapses over a period of time. Accordingly, a variety of ways of determining the second threshold of ride cancellations or ride-lapses are herein contemplated.

At act 520, the provider efficiency control system 102 in response to the determination at act 518 switches the provider device 105b to the offline mode 212. At act 522, the provider efficiency control system 102 sends an offline notification to the provider device 105b via the dynamic transportation matching application 107b. In some embodiments, the offline notification may include digital content that when displayed at the dynamic transportation matching application 107b indicates to the provider a current status of the offline mode 212 and/or a reason for the offline notification (e.g., too many ride cancellations or too many ride-lapses).

Figure 6B:
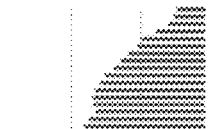

As mentioned above, the provider efficiency control system 102 can prohibit a provider device 105 from switching from the offline mode 212 to the online mode 210. FIGS. 6A-6B illustrate a set of example graphical user interfaces ("GUIs") 604-614 of the dynamic transportation matching application 107 as displayed on a computing device 602, all arranged in accordance with at least one embodiment of the present disclosure. In particular, the provider efficiency control system 102 causes the computing device 602 (e.g., a provider client device, a vehicle monitor, etc. of the provider device 105) to display one or more of the GUIs 604-614 via the dynamic transportation matching application 107 in response to an active online mode control condition preventing a provider in the offline mode 212 from switching to the online mode 210 (e.g., as described above in conjunction with the acts and algorithms of FIG. 3).

For example, GUI 604 includes a guidance string that recites "Can't go online now" with an explanation and prompt to be notified at a later time when the provider device can switch to the online mode 210. The prompt also includes a notification element (e.g., a "Notify me" button) by which a user can request such a notification from the provider efficiency control system 102. At the GUI 608, in response to a user input selecting the "Notify me" button at the GUI 606, the provider efficiency control system 102 causes to display a confirmation screen that confirms to the provider that the request to be notified at a better time to drive has been logged. For example, the guidance string in the GUI 608 recites "We'll notify you."

In these or other embodiments, one or more of the GUIs 604-614 may include a link and/or expandable element that when selected describes why the provider cannot currently switch to the online mode 210 from the offline mode 212 (e.g., as displayed at the bottom of the GUI 608). For example, the GUI 614 may open, in response to a user input selection of the link in the GUI 608, the GUI 614 with an example set of user interface elements and digital content explaining why the provider is unable to switch to the online mode 210, tips for switching to the online mode 210, and/or tips for remaining in the online mode 210 once there.

At GUIs 610-612, the provider efficiency control system 102 causes to display at the dynamic transportation matching application 107 a set of recommended times and/or locations for driving that will increase a likelihood of being able to switch to the online mode 210. For some of the recommended times and/or locations, the provider efficiency control system 102 provides a selection element that the user can tap or swipe to turn on (e.g., to reserve a spot in that corresponding time frame, set a reminder alarm for, etc.). In some embodiments, the recommended times and/or locations may not necessarily guarantee the opportunity to switch to the online mode 210 at the reserved time (e.g., due to interim changes in the inputs 201). Additionally or alternatively, the provider efficiency control system 102 in some embodiments may accept tokens from the provider device 105 by which the provider can guarantee a reserved time slot (e.g., morning commute), event slot (e.g., DET vs. NYK at Madison Square Garden), or airport queue.

Figure 7A:
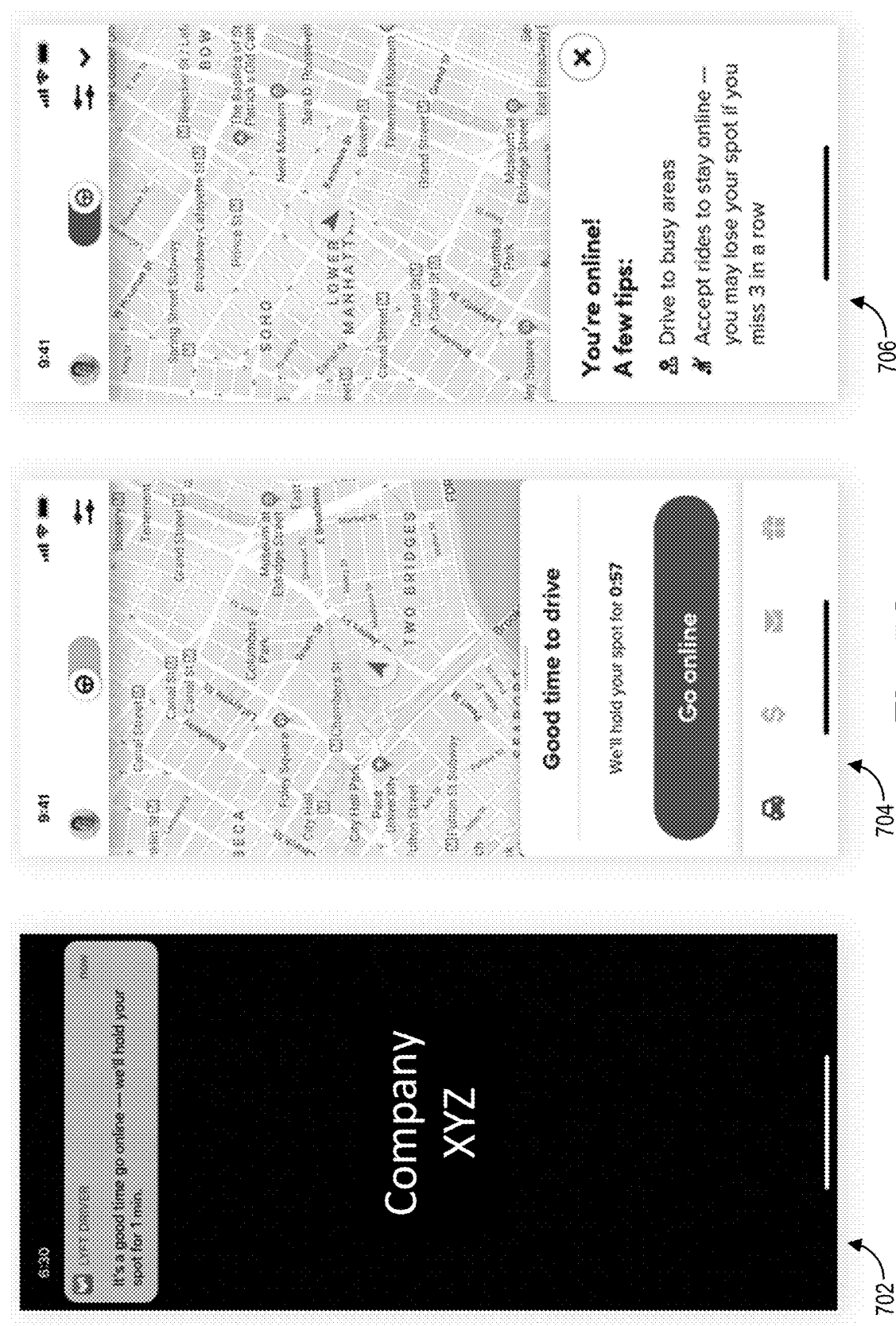
FIGS. 7A-7B illustrate another set of graphical user interfaces displayable on a computing device via a dynamic transportation matching application in accordance with one or more embodiments.
Figure 7B:
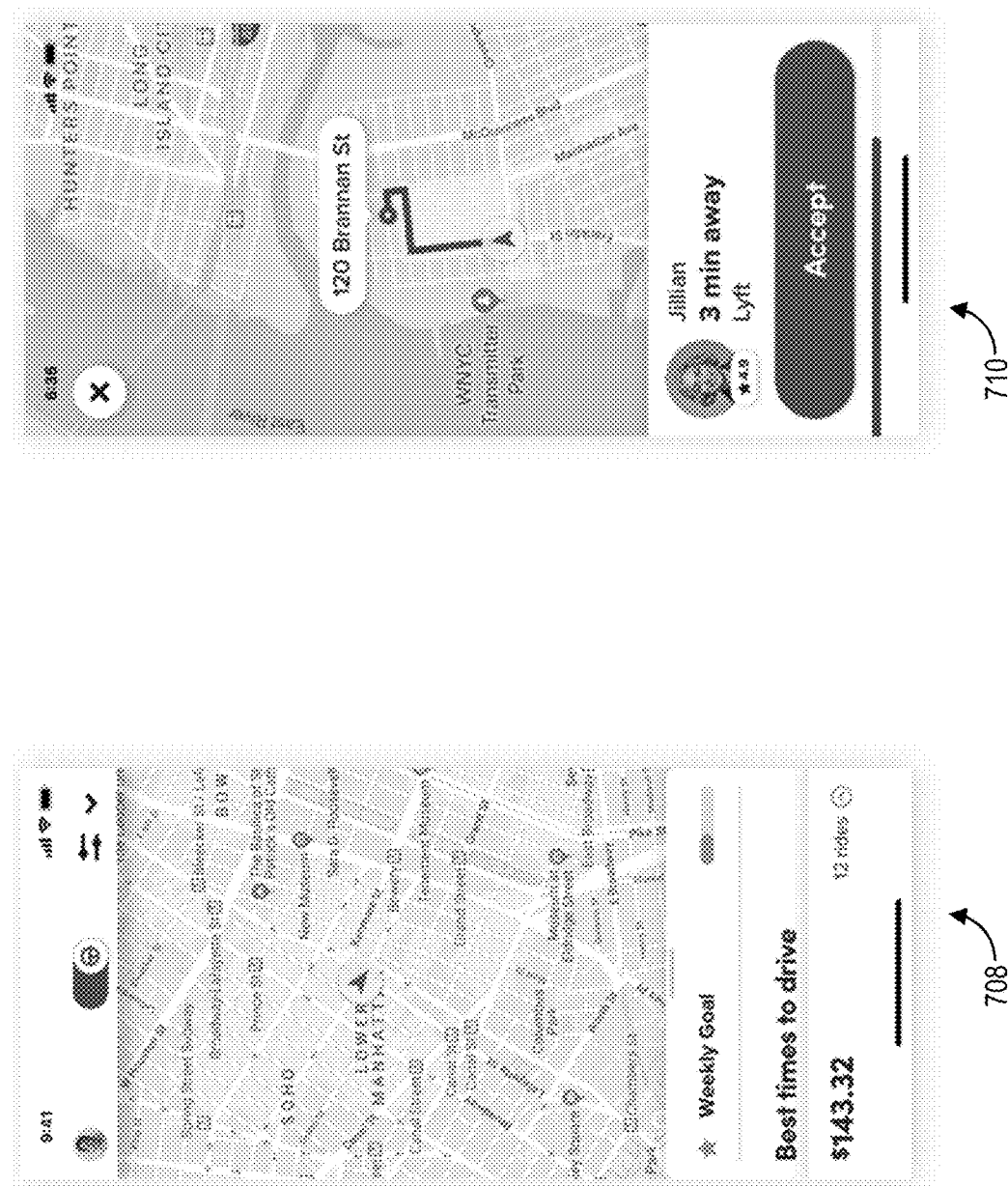

As mentioned above, the provider efficiency control system 102 can notify a provider device 105 upon determining an available opportunity to switch to the online mode 210. FIGS. 7A-7B illustrate a set of example GUIs 702-710 of the dynamic transportation matching application 107 as displayed on the computing device 602, all arranged in accordance with at least one embodiment of the present disclosure. In particular, the provider efficiency control system 102 causes the computing device 602 to display one or more of the GUIs 702-710 in response to the provider efficiency control system 102 determining an available spot for the provider device 105 to switch to the online mode 210 and in response to the provider efficiency control system 102 receiving a corresponding selection.

In some embodiments, the provider efficiency control system 102 can cause the computing device 602 to display a notification, even when the computing device 602 does not currently have the dynamic transportation matching application 107 open. For example, GUI 702 indicates a banner notification from the provider efficiency control system 102 overlaying another opened application different from the dynamic transportation matching application 107, in which the banner notification indicates to the provider that now is a good time to switch to the online mode 210. Additionally or alternatively, the notification may include a time limit and/or a timer element indicating an amount of time for which the provider device 105 has to send to the provider efficiency control system 102 a response to the notification.

For instance, upon opening the dynamic transportation matching application 107 (e.g., by selecting the notification presented in the GUI 702), the provider efficiency control system 102 may cause the computing device 602 to display a countdown for which the user has to switch to the online mode 210 as shown for example in the GUI 704 with the countdown timer and associated "Go online" button. After receiving the user input selecting the "Go online" button of GUI 704, the provider efficiency control system 102 causes the computing device 602 to display a confirmation screen and/or tips to stay in the online mode 210 as shown for example in the GUI 706.

Further, after the provider device 105 is in the online mode 210, the provider efficiency control system 102 may cause the computing device 602 to display one or more statistics, goals, and/or other dashboard items, like the weekly goal shown in the GUI 708. Additionally, once in the online mode 210, the dynamic transportation matching system 103 may send a transport request for display and acceptance at the GUI 710.

Figure 8:
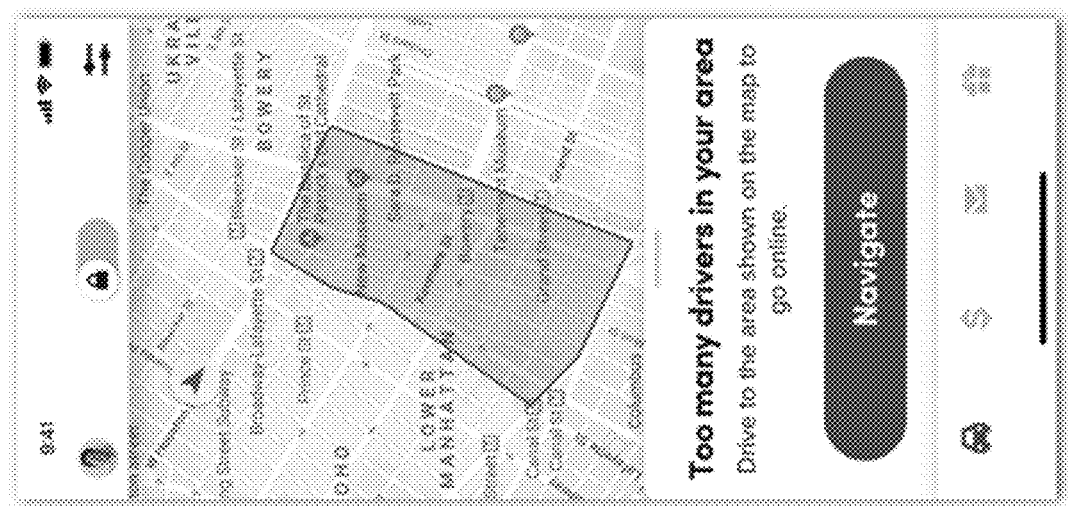
FIG. 8 illustrates a graphical user interface displayable on a computing device via a dynamic transportation matching application in accordance with one or more embodiments.
Figure 9:
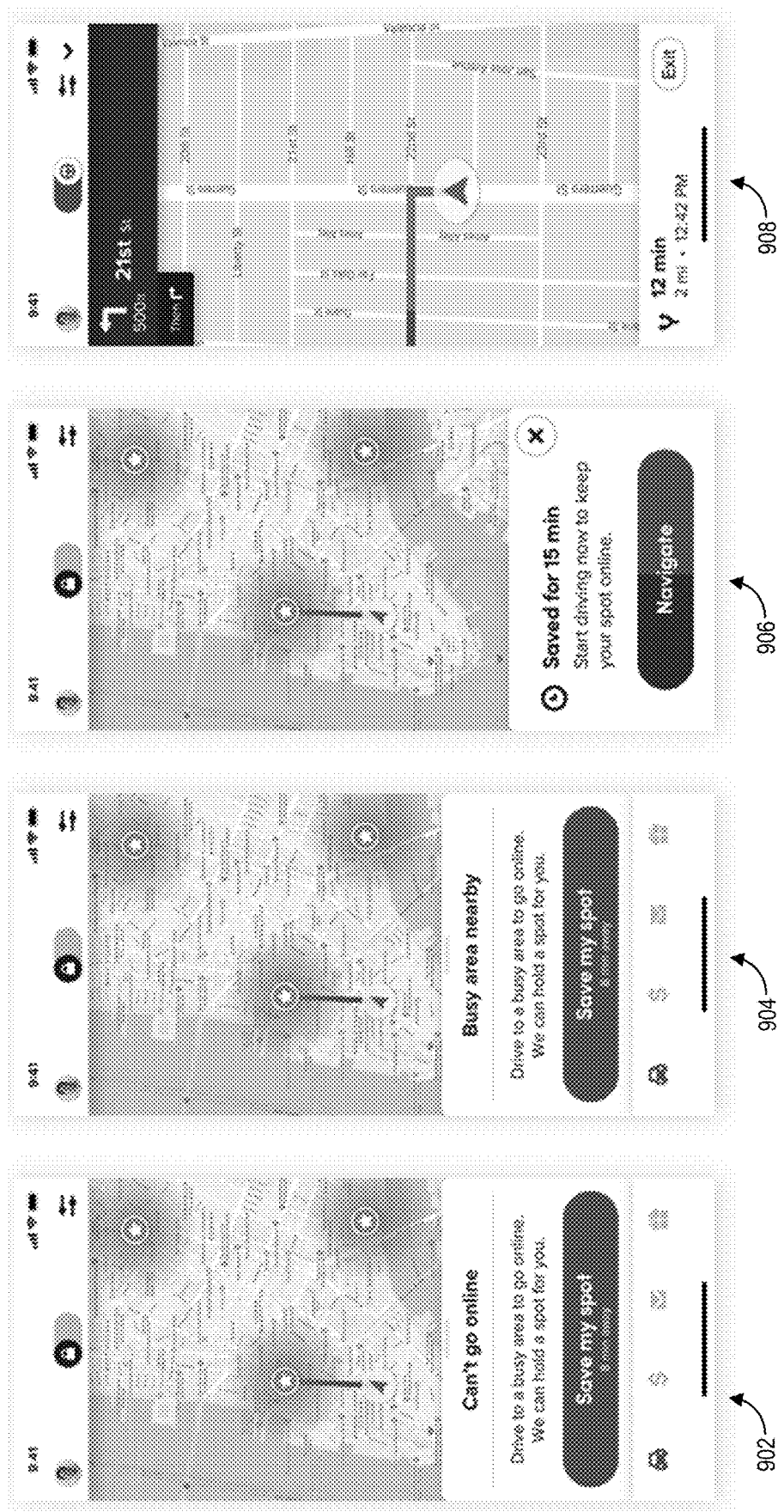
FIG. 9 illustrates yet another set of graphical user interfaces displayable on a computing device via a dynamic transportation matching application in accordance with one or more embodiments.
Figure 10A:
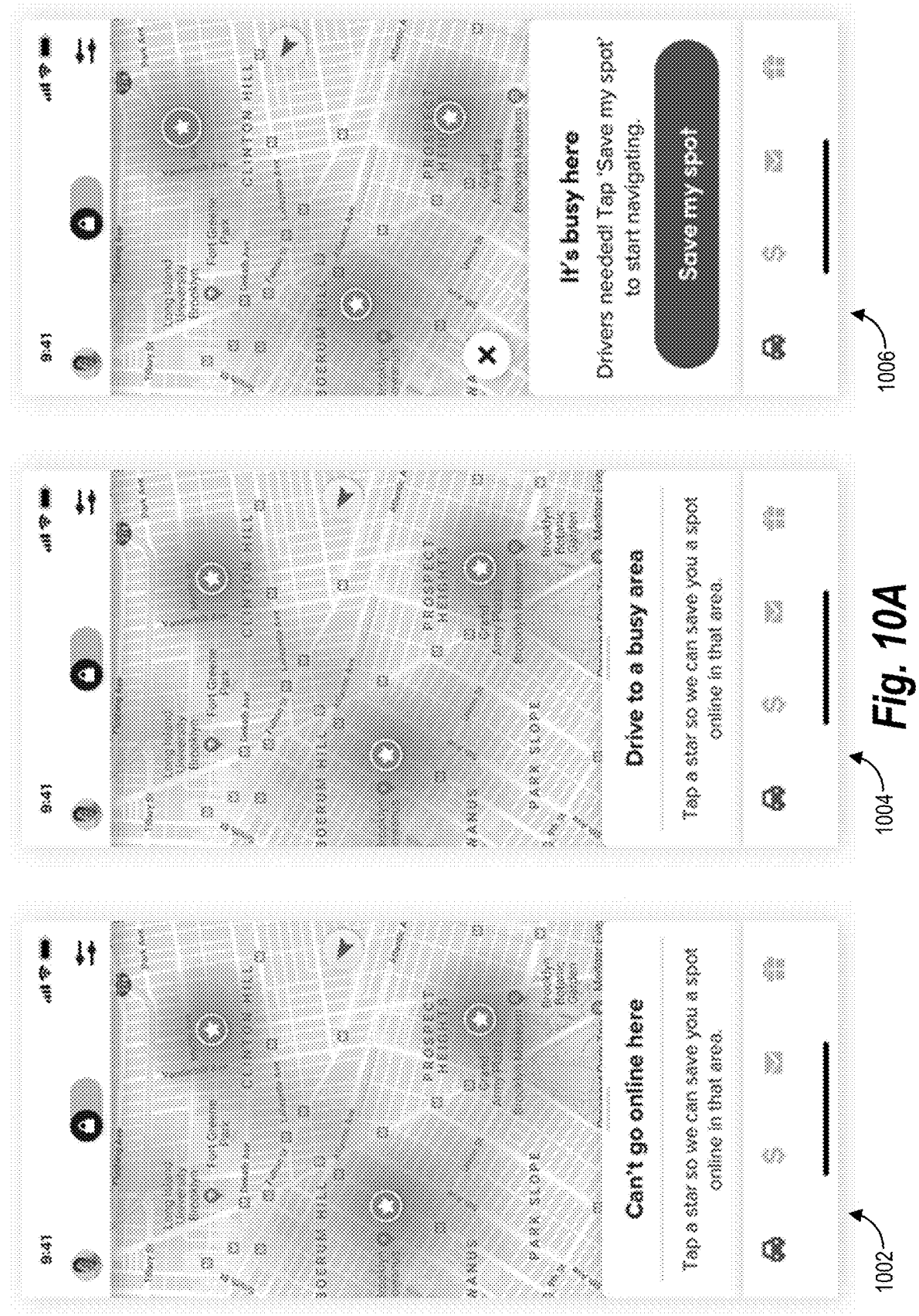
FIGS. 10A-10B illustrate another set of graphical user interfaces displayable on a computing device via a dynamic transportation matching application in accordance with one or more embodiments.
Figure 10B:
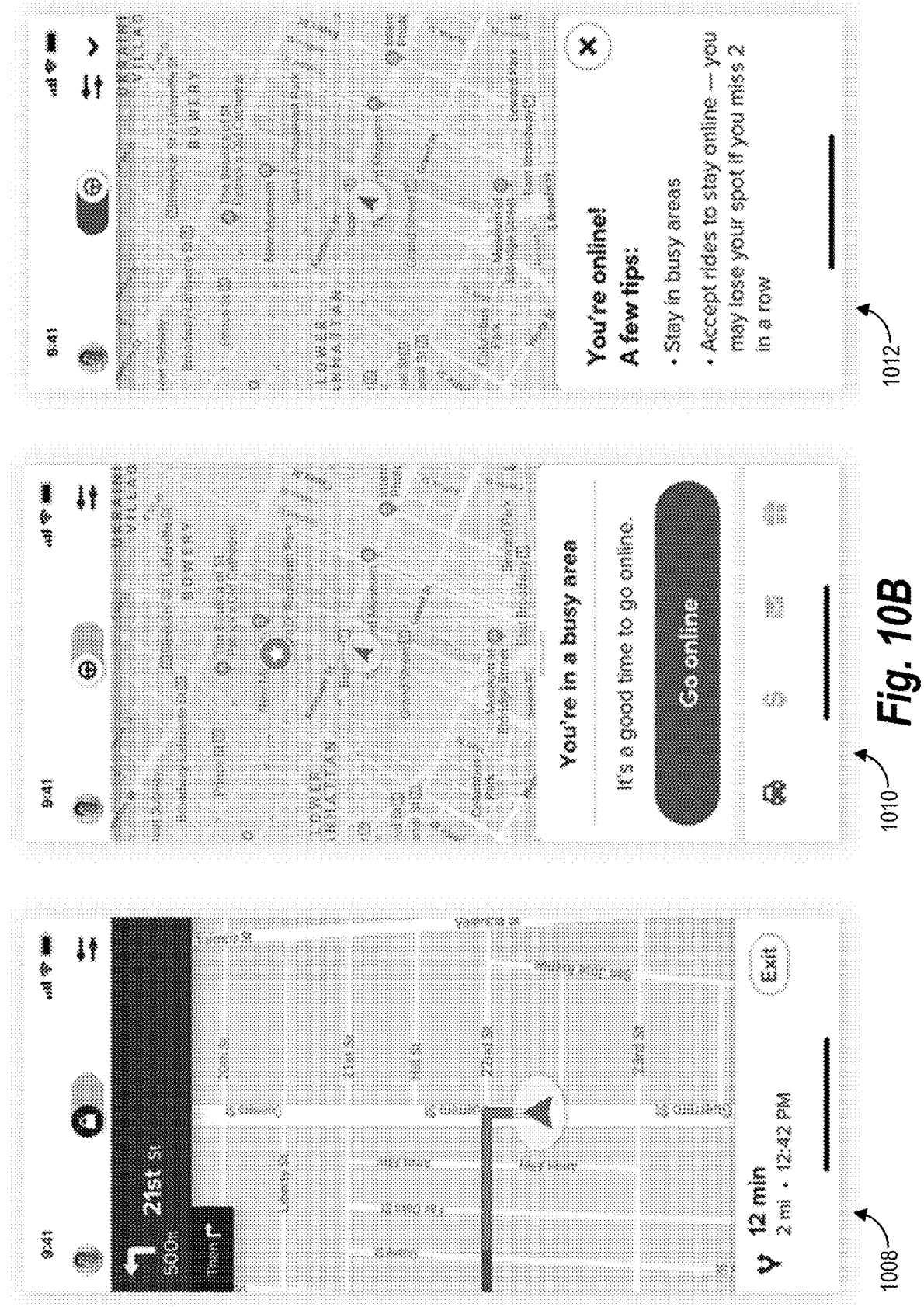
Figure 11:
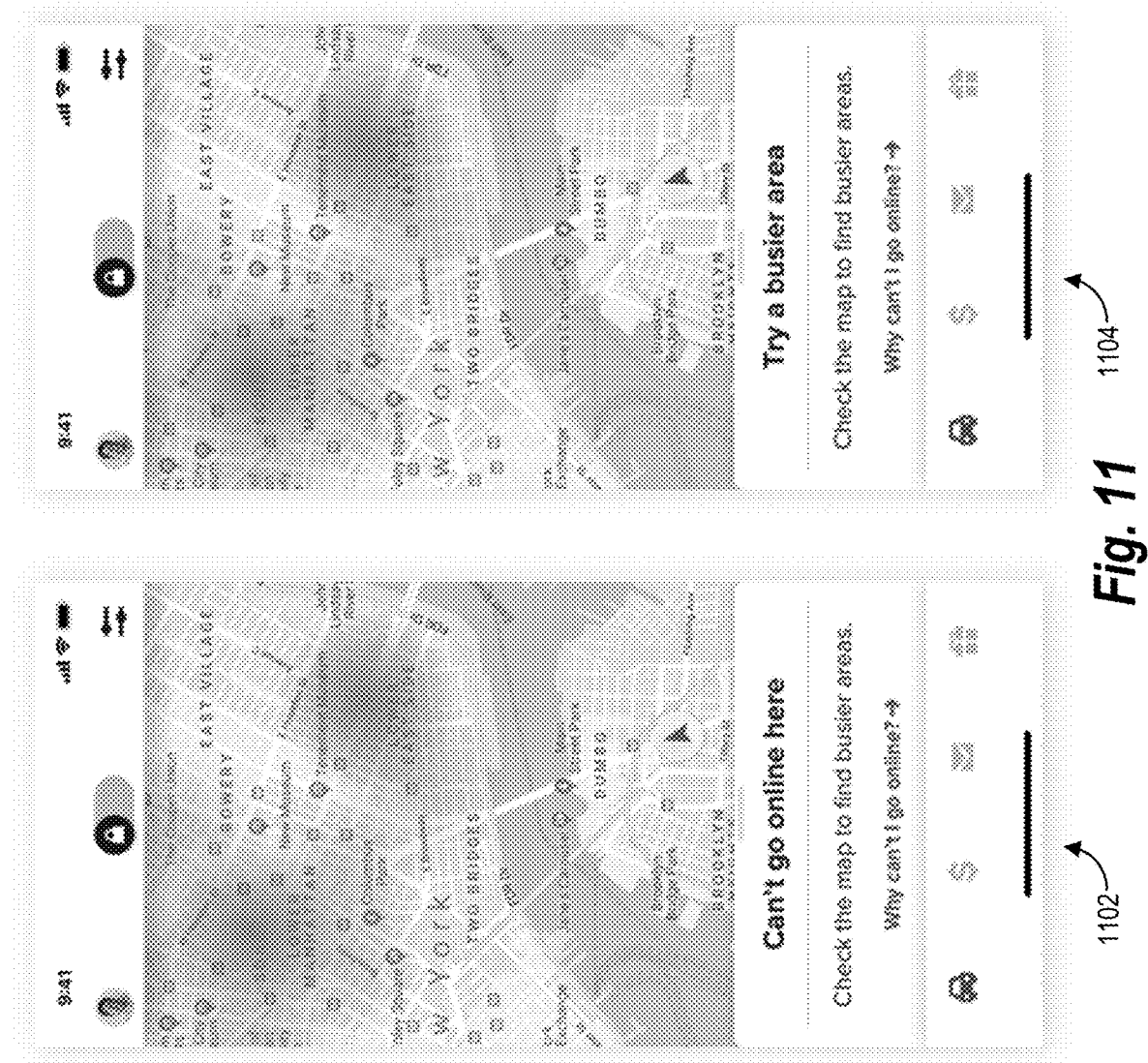
FIG. 11 illustrates a set of graphical user interfaces displayable on a computing device via a dynamic transportation matching application in accordance with one or more embodiments.

As mentioned above, the provider efficiency control system 102 can prohibit a provider device 105 from switching from the offline mode 212 to the online mode 210. FIG. 8 illustrates an example GUI 802 of the dynamic transportation matching application 107 as displayed on a computing device 602, all arranged in accordance with at least one embodiment of the present disclosure. In particular, the provider efficiency control system 102 causes the computing device 602 to display the GUI 802 in response to an active online mode control condition preventing a provider in the offline mode 212 from switching to the online mode 210 (e.g., as described above in conjunction with the acts and algorithms of FIG. 3). In particular, the GUI 802 illustrates an example dynamic response indicating to the provider to drive to another area (e.g., a different geohash). Further, the provider efficiency control system 102 provides at the GUI 802 the selectable option to provide navigation assistance to the provider device 105.

Similar to FIG. 8, FIGS. 9-10B illustrate a set of example GUIs 902-908 and 1002-1012 of the dynamic transportation matching application 107 as displayed on the computing device 602, all arranged in accordance with one or more embodiments of the present disclosure. In particular, the provider efficiency control system 102 causes the computing device 602 to display the GUIs 902-908 and/or the GUIs 1002-1012 in response to an active online mode control condition preventing a provider in the offline mode 212 from switching to the online mode 210 (e.g., as described above in conjunction with the acts and algorithms of FIG. 3). In particular, the GUIs 902-908 and/or the GUIs 1002-1012 illustrate various embodiments of an example dynamic response displayed for the provider to select a pinned (e.g., a starred) hotspot at which there are guaranteed transport requests to be matched with the provider device 105.

As shown in the GUIs 902-904, in some embodiments, the provider efficiency control system 102 can cause the dynamic transportation matching application 107 to display a pre-selected pinned hotspot (e.g., based on a closest proximity to the provider device 105). Additionally or alternatively, the provider efficiency control system 102 can reserve a spot for the provider device 105 in the online mode 210 at a pinned hotspot in response to receiving a user selection at a reserve button (e.g., "Save my spot"), which is also shown in the GUIs 902-904. However, in some embodiments, the reserved spot for the provider device 105 in the online mode 210 at the pinned hotspot may be time-limited. For example, the provider device 105 may have a finite period of time to navigate to the pinned hotspot as shown in the GUI 906. Further, in some embodiments, the provider efficiency control system 102 may cause the computing device 602 to display a countdown timer (not shown) indicating an amount of time remaining to relocate to the pinned hotspot, in which the countdown timer updates in real-time.

In these or other embodiments, the provider efficiency control system 102 can cause the dynamic transportation matching application 107 to present for user selection a pinned hotspot, which when selected, automatically reserves a spot for the provider device 105 in the online mode 210 at the pinned hotspot as selected (shown in GUIs 1002-1004). Additionally or alternatively, the provider efficiency control system 102 can reserve a spot for the provider device 105 in the online mode 210 at a pinned hotspot in response to receiving a user selection at a reserve button (e.g., "Save my spot") as shown in the GUI 1006.

After the provider device 105 reaches a particular location within the pinned hotspot or is otherwise positioned within the boundaries of the pinned hotspot, the provider efficiency control system 102 may cause the dynamic transportation application 107 to prompt the provider to switch to the online mode 210 (e.g., via the "Go online" button) as shown in GUI 1010.

Similar to FIGS. 9-10B, FIG. 11 illustrates a set of example GUIs 1102-1104 of the dynamic transportation matching application 107 as displayed on the computing device 602, all arranged in accordance with one or more embodiments of the present disclosure. In particular, the provider efficiency control system 102 causes the computing device 602 to display the GUIs 1102-1104 in response to an active online mode control condition preventing a provider in the offline mode 212 from switching to the online mode 210 (e.g., as described above in conjunction with the acts and algorithms of FIG. 3). In particular, the GUIs 1102-1104 illustrate an example embodiment of a dynamic response displayed for the provider to navigate to a general hotspot at which there are no guaranteed transport requests to be matched with the provider device 105. However, the general hotspot can be associated with increased transport requests and therefore an increased likelihood for the provider device 105 to be able to switch to the online mode 210.

Figure 12A:
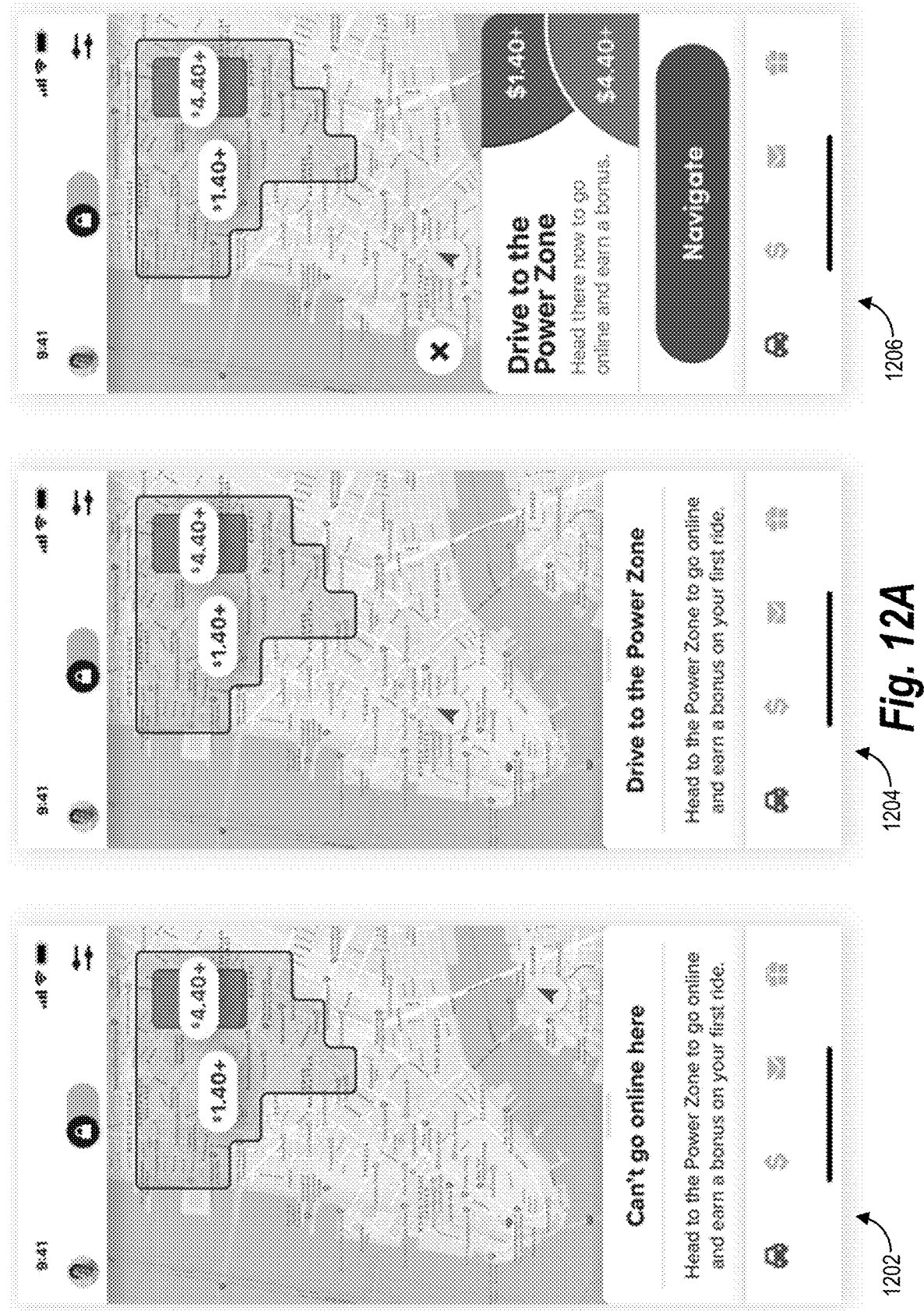
FIGS. 12A-12B illustrate another set of graphical user interfaces displayable on a computing device via a dynamic transportation matching application in accordance with one or more embodiments.
Figure 12B:
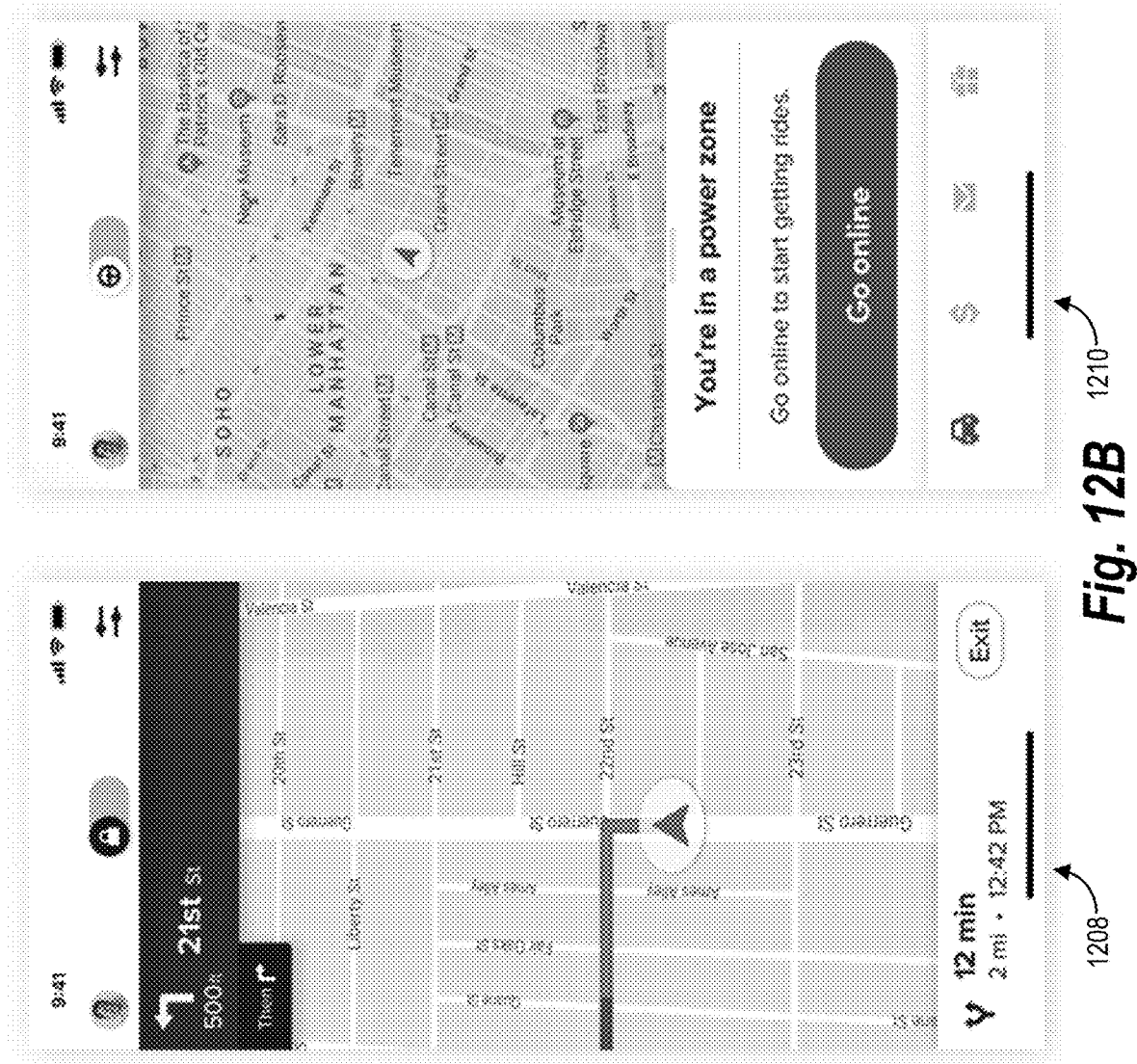

FIGS. 12A-12B illustrate a set of example GUIs 1202-1210 of the dynamic transportation matching application 107 as displayed on the computing device 602, all arranged in accordance with one or more embodiments of the present disclosure. In particular, the provider efficiency control system 102 causes the computing device 602 to display the GUIs 1202-1210 in response to an active online mode control condition preventing a provider in the offline mode 212 from switching to the online mode 210 (e.g., as described above in conjunction with the acts and algorithms of FIG. 3). In particular, the GUIs 1202-1210 illustrate an example embodiment of a dynamic response displayed for the provider to navigate to a personal power zone in another area. In some embodiments, the provider efficiency control system 102 can help navigate the provider device 105 to the personal power zone, and after the provider device enters the boundaries of the personal power zone, the provider efficiency control system 102 prompts the provider to switch to the online mode 210.

Figure 13A:
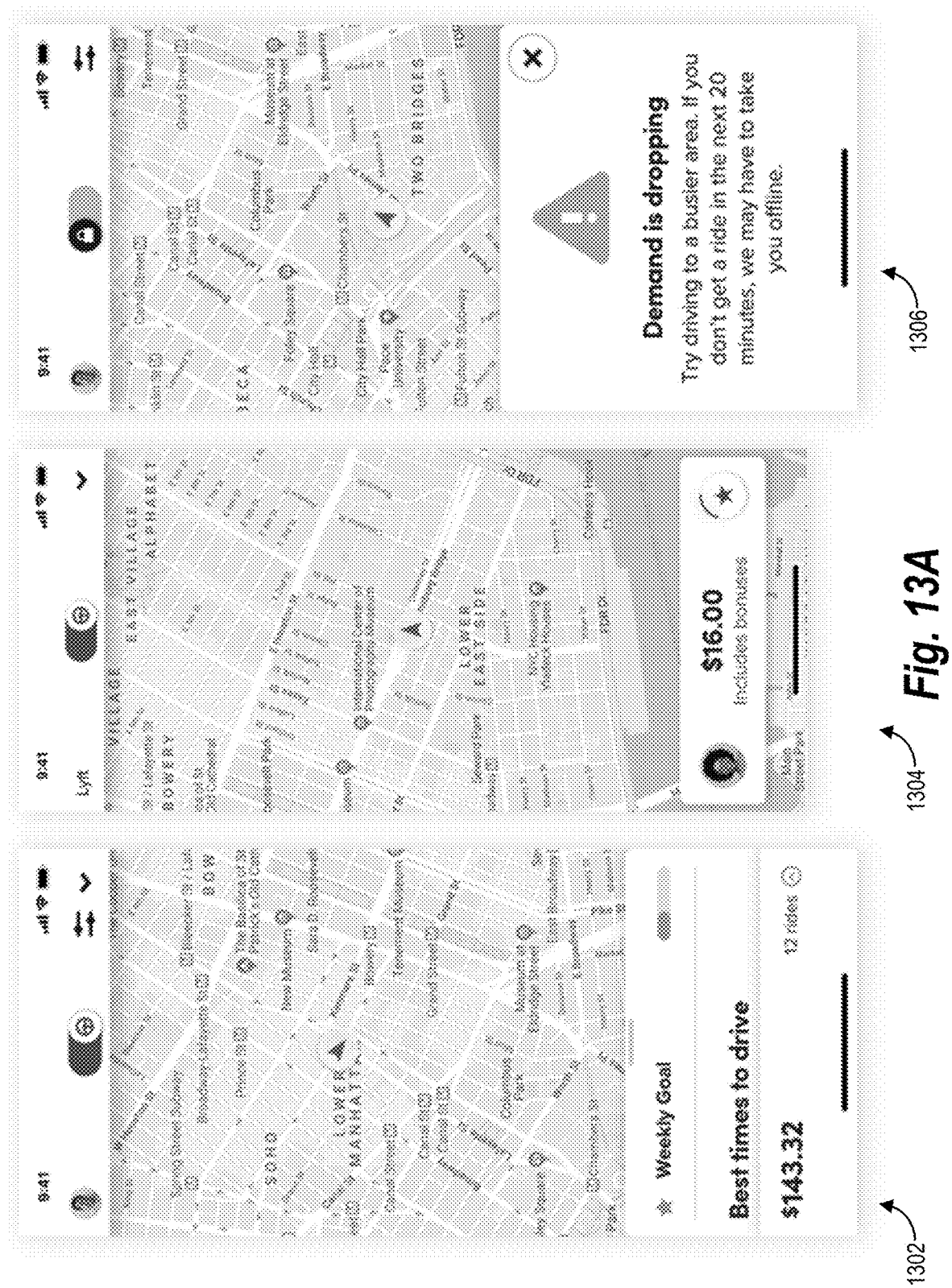
FIGS. 13A-13C illustrate yet another set of graphical user interfaces displayable on a computing device via a dynamic transportation matching application in accordance with one or more embodiments.
Figure 13B:
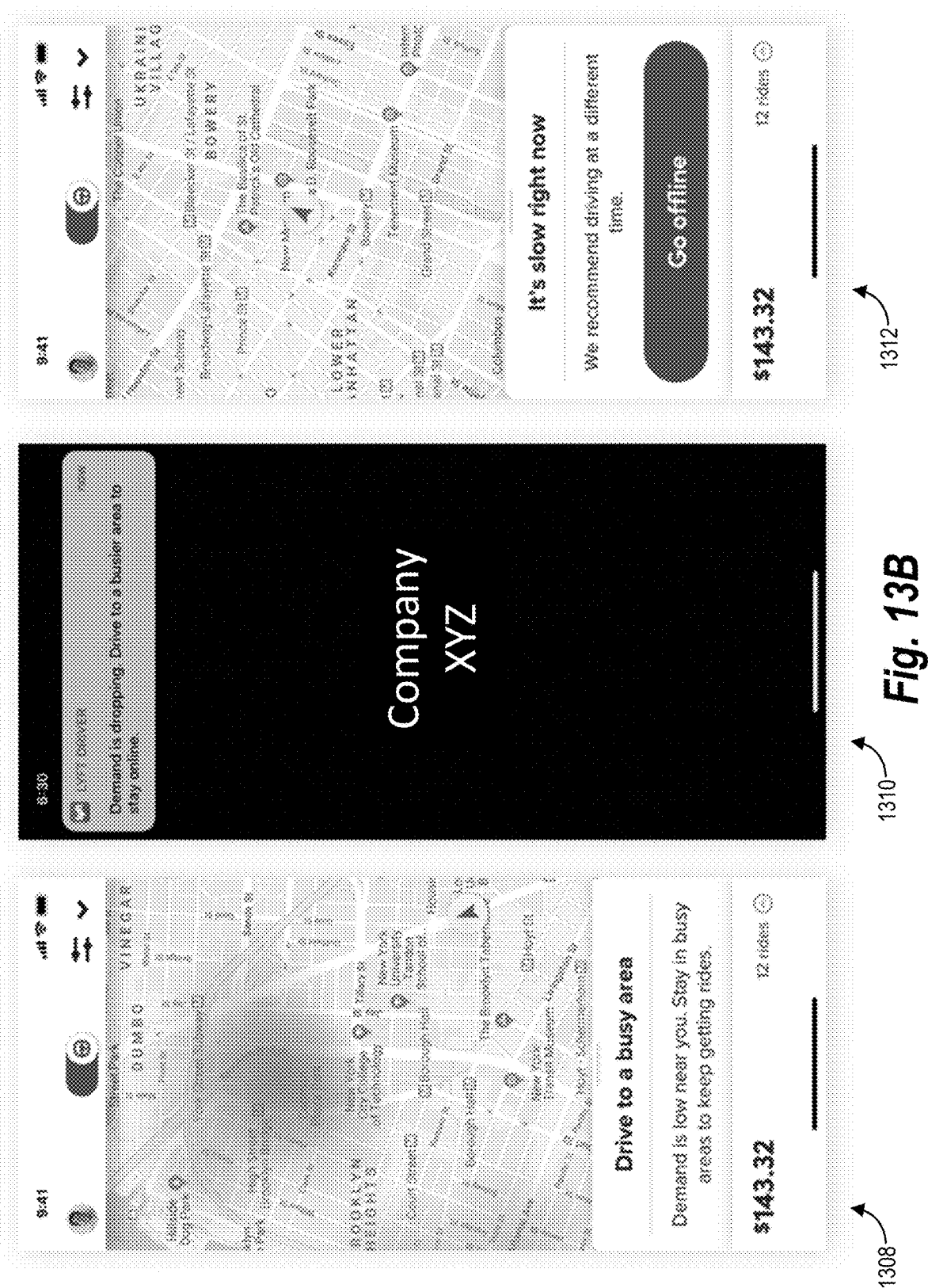
Figure 13C:
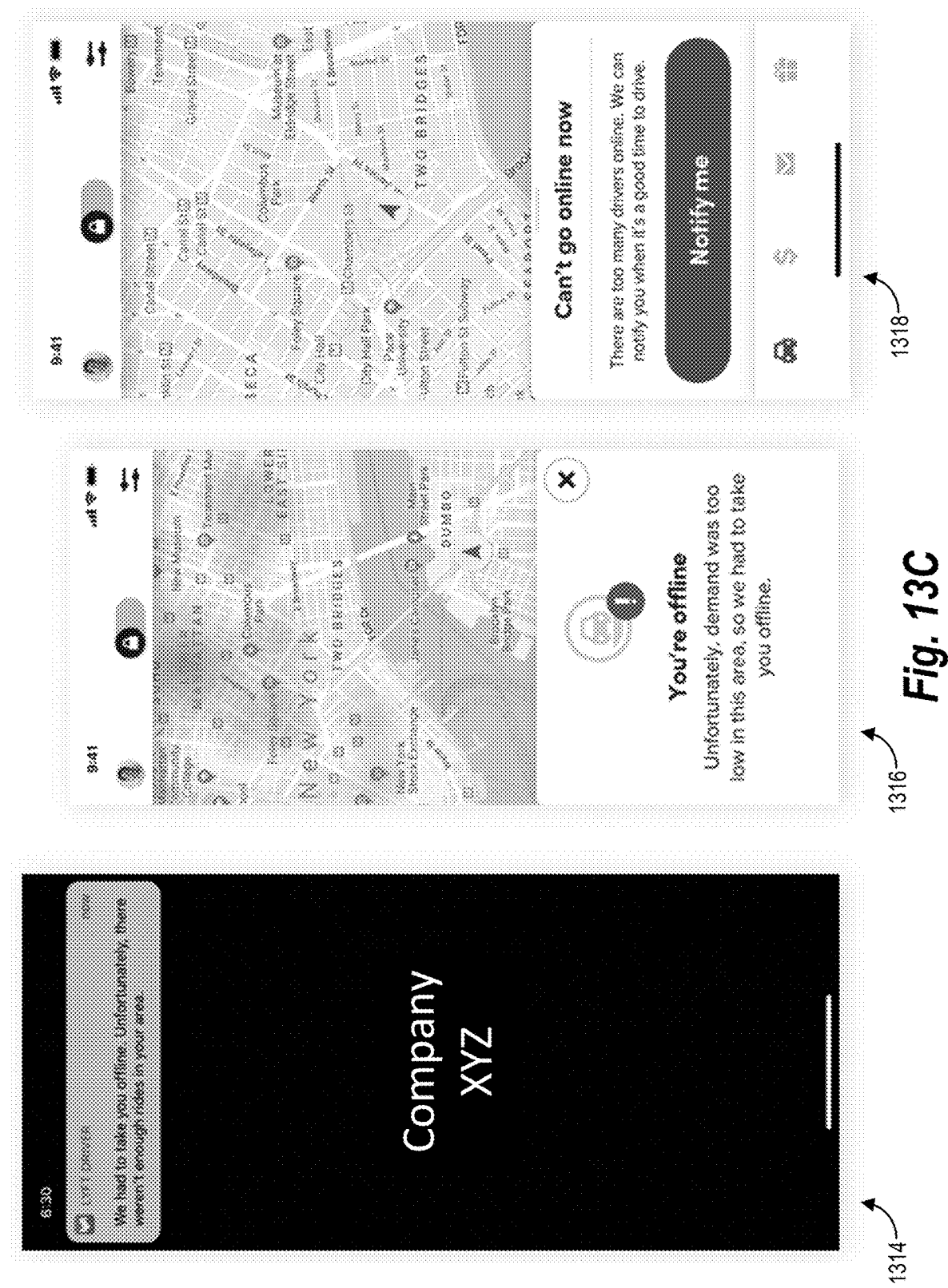

FIGS. 13A-13C illustrate a set of example GUIs 1302-1318 of the dynamic transportation matching application 107 as displayed on the computing device 602, all arranged in accordance with one or more embodiments of the present disclosure. In particular, the provider efficiency control system 102 causes the computing device 602 to display the GUIs 1302-1318 in response to an active online mode control condition being activated while a provider device 105 is already in the online mode 210 (e.g., as described above in conjunction with the acts and algorithms of FIGS. 4A-4B). In particular, the GUIs 1302-1318 illustrate some example embodiments of an idle notification and corresponding dynamic response recommendations.

If the dynamic transportation matching application 107 is open, the idle notification may appear as illustrated for example in the GUI 1302. If the dynamic transportation matching application 107 is not open, the idle notification may appear as illustrated for example in the GUI 1304. In either embodiment, the provider efficiency control system 102 indicates with the idle notification a dynamic response recommendation to drive to a busier area to keep receiving assigned transportation requests (i.e., to remain in the online mode 210). Additionally or alternatively to the idle notification, the provider efficiency control system 102 may prompt the provider to switch to the offline mode 212 as shown in the GUI 1306.

If the provider efficiency control system 102 determines that the provider device 105 did not relocate to a busier area (e.g., within a threshold period of time), the provider efficiency control system 102 may switch the provider device 105 to the offline mode 212 and send an offline notification as shown in one or both of the GUIs 1314-1316. In these or other embodiments, the offline notification may explain the reason for switching the provider device 105 to the offline mode 212 (e.g., too few transportation requests in the currently located geohash, too many of the provider devices 105a-105n in the online mode 210 in the currently located geohash, etc.). To get back into the online mode 210, the provider efficiency control system 102 provides at the GUI 1318 of the dynamic transportation matching application 107 opportunities to do so as described above in conjunction with the GUIs 604-614 of FIGS. 6A-6B.

Figure 14A:
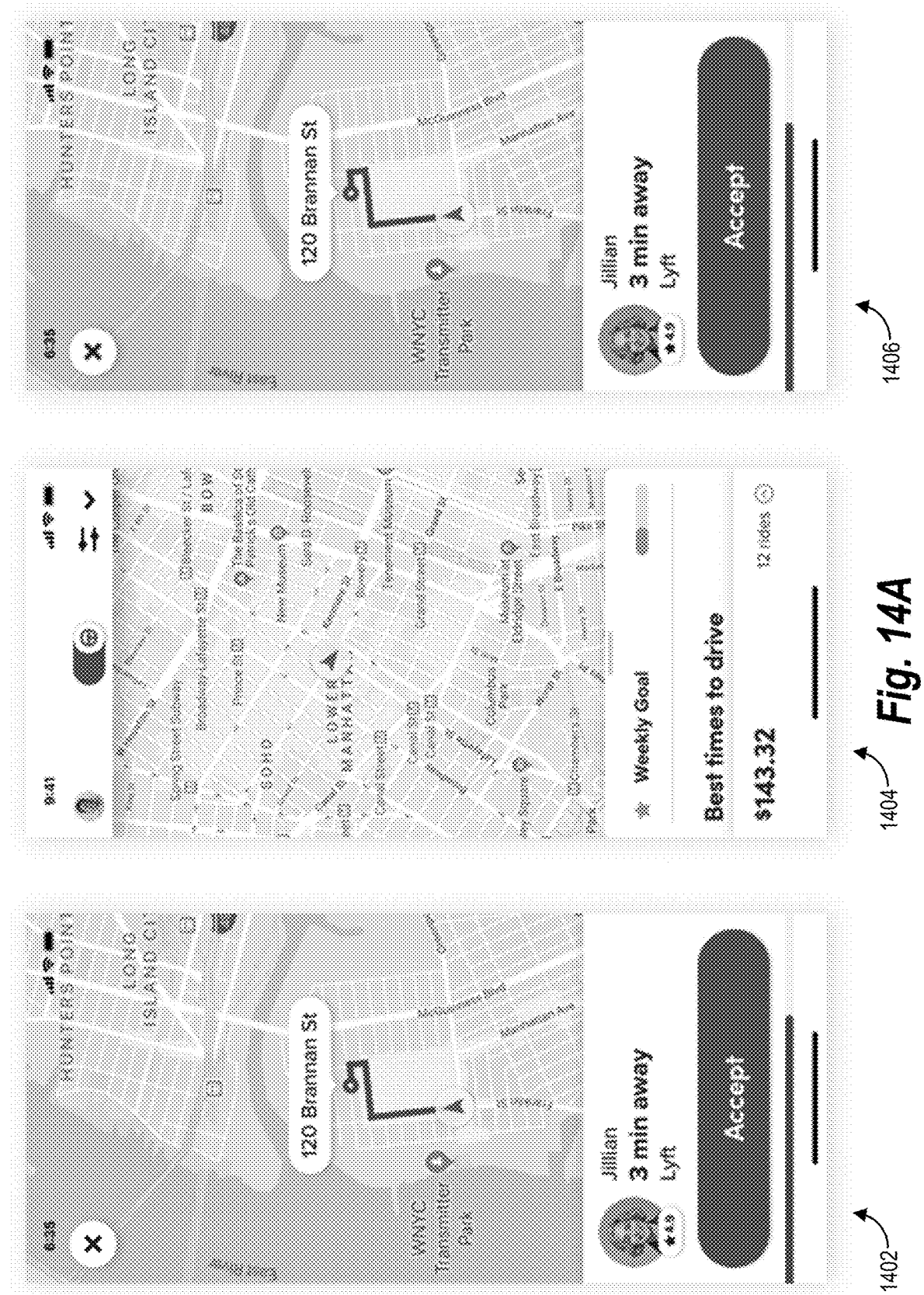
FIGS. 14A-14C illustrate a set of graphical user interfaces displayable on a computing device via a dynamic transportation matching application in accordance with one or more embodiments.
Figure 14B:
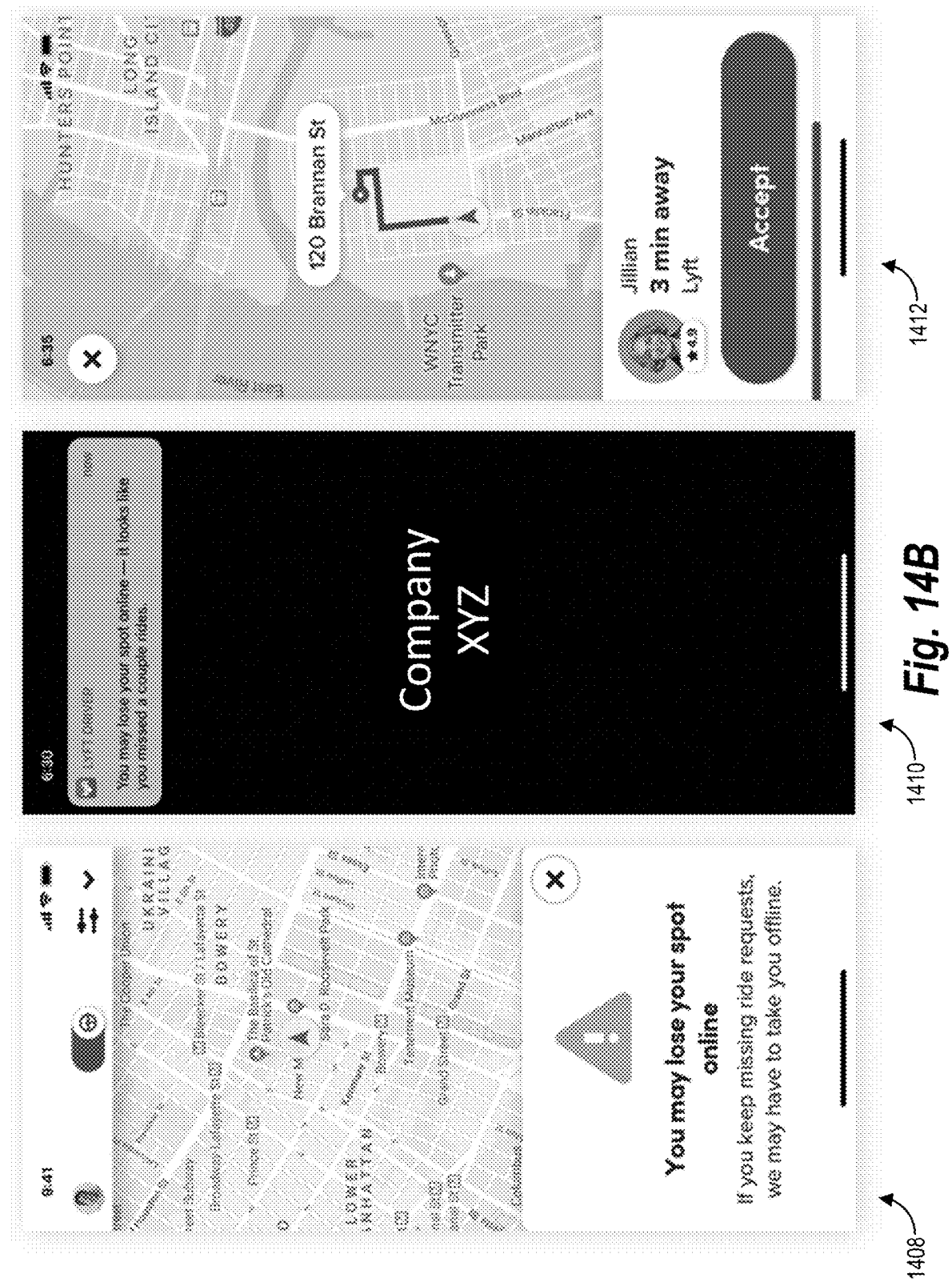
Figure 14C:
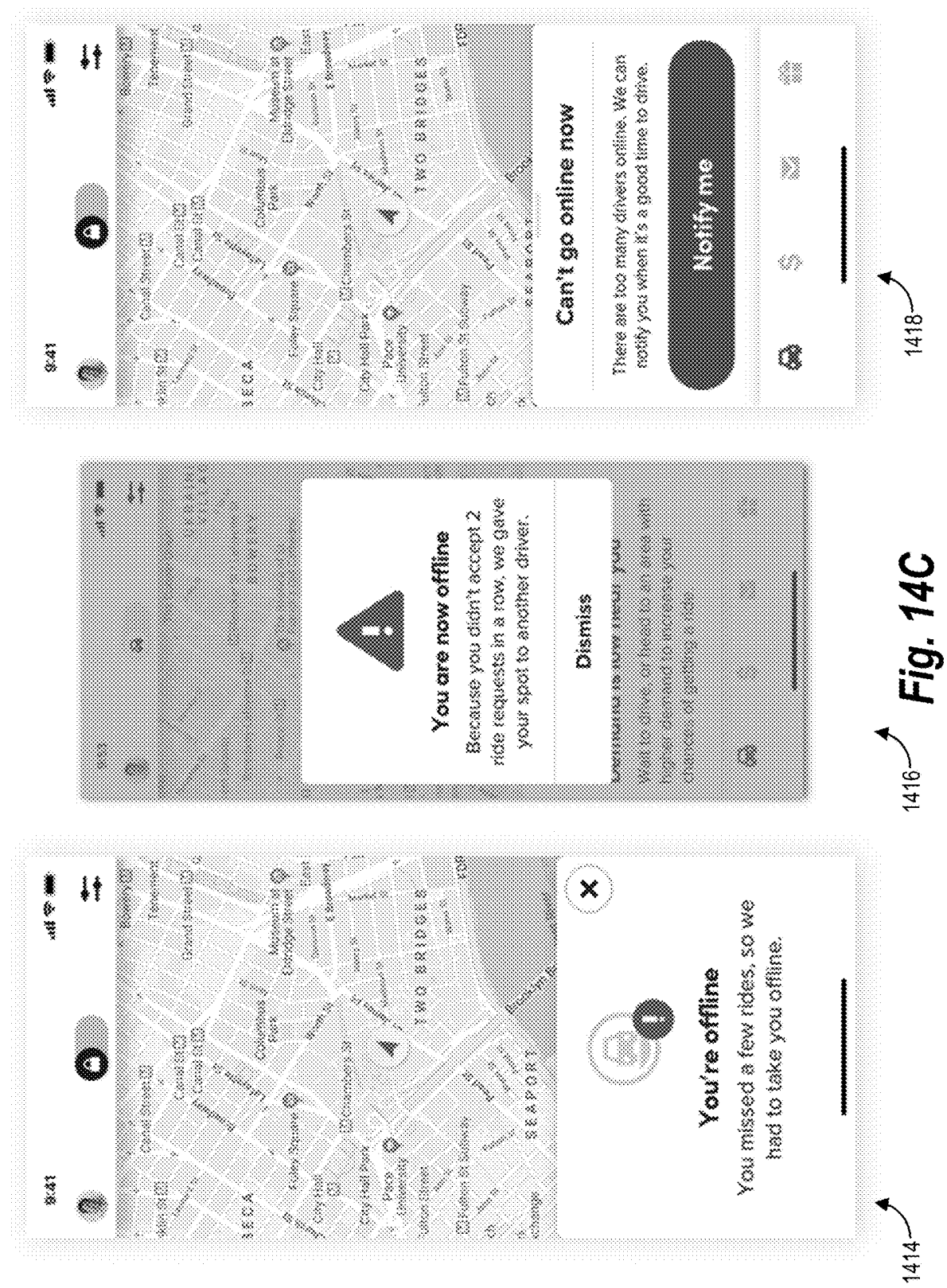

FIGS. 14A-14C illustrate a set of example GUIs 1402-1418 of the dynamic transportation matching application 107 as displayed on the computing device 602, all arranged in accordance with one or more embodiments of the present disclosure. In particular, the provider efficiency control system 102 causes the computing device 602 to display the GUIs 1402-1418 in response to an active online mode control condition being activated while a provider device 105 is already in the online mode 210 (e.g., as described above in conjunction with the acts and algorithms of FIGS. 5A-5B). In particular, the GUIs 1402-1418 illustrate some example embodiments of a warning notification for lapsed/cancelled ride-assignments and corresponding dynamic response recommendations.

The GUIs 1402-1404 illustrate a first lapsed ride-assignment, and the GUI 1406 illustrates a second lapsed ride-assignment. In response to one or more lapsed or cancelled ride-assignments, the provider efficiency control system 102 may cause the computing device 602 to display the warning notification shown for example in the GUIs 1408 or 1410 of the dynamic transportation matching application 107. As also indicated in the warning notification, the provider efficiency control system 102 can, in a dynamic response recommendation, expressly or implicitly instruct the provider to accept one or more of the next few ride assignments, or else risk being switched to the offline mode 212. The GUI 1412 illustrates a third lapsed ride-assignment, and as a result, the provider efficiency control system 102 switches the provider device 105 into the offline mode 212 and provides an offline notification to the dynamic transportation matching application 107 as shown in the example GUIs 1414-1416.

FIG. 15 illustrates an example GUI 1502 of the dynamic transportation matching application 107 as displayed on the computing device 602, all arranged in accordance with one or more embodiments of the present disclosure. In particular, the provider efficiency control system 102 causes the computing device 602 to display the GUI 1502 when the provider device 105 is in an area subject to the online mode control condition, but is nevertheless exempt from the restrictions of the online mode control condition. For example, the GUI 1502 indicates the provider is not in a busy area, but is still in the online mode 210. In these or other embodiments, the provider efficiency control system 102 reserves these types of exemptions to the online mode control condition for redeemed exemption tokens and/or for some types of ride service categories not associated with a standard service category (e.g., premium, wheel-chair accessible, luxury, shared, shared saver, etc.). Additionally or alternatively, the provider efficiency control system 102 may nonetheless populate the guidance string underneath the map to recite instructions to drive to a busy area.

Figure 16:
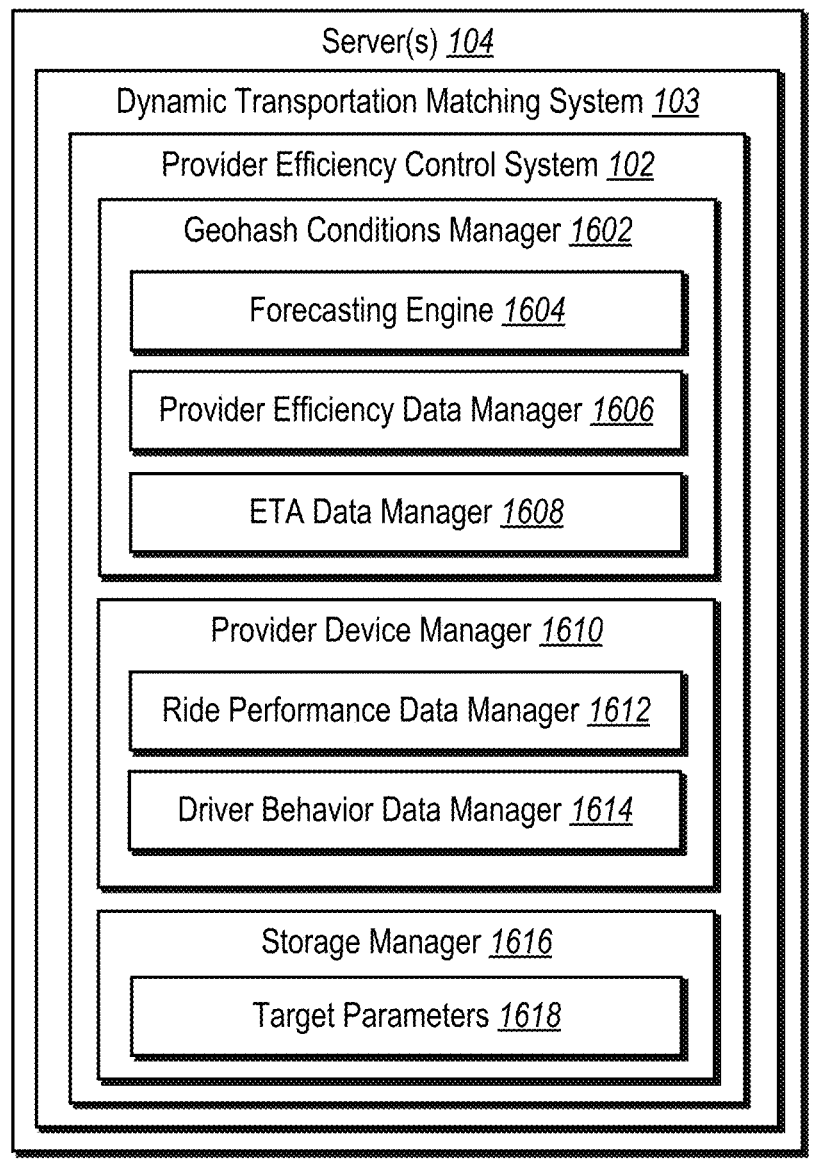
FIG. 16 illustrates a schematic diagram of a provider efficiency control system in accordance with one or more embodiments.

FIG. 16 illustrates a schematic diagram of an example embodiment of the provider efficiency control system 102 of a computing system 1600 arranged according to at least one embodiment of the present disclosure. As shown in FIG. 16, the provider efficiency control system 102 includes various components for performing the processes and features described herein. For example, as shown in FIG. 16, the provider efficiency control system 102 includes a geohash conditions manager 1602, a provider device manager 1610, and a storage manager 1616.

Each of the components 1602-1618 of the provider efficiency control system 102 can be implemented using a computing device including at least one processor executing instructions that cause the performance of the processes described herein. In some embodiments, the components 1602-1618 of the provider efficiency control system 102 can be implemented on a single server or across multiple servers. Additionally or alternatively, a combination of one or more server devices and one or more computing devices can implement the components described herein in a different arrangement than illustrated in FIG. 16. Additionally or alternatively, the components described herein can comprise a combination of computer-executable instructions and hardware.

As illustrated in FIG. 16, the provider efficiency control system 102 includes the geohash conditions manager 1602, which handles a forecasting engine 1604, a provider efficiency data manager 1606, and an ETA data manager 1608. In some embodiments, the forecasting engine 1604 handles the sending, receiving, storing, requesting, analyzing, and/or predicting of data. For example, the forecasting engine 1604 can predict traffic conditions, forecast a number of transport requests, estimate a number of future online providers (e.g., a static forecast based on historical geographic data and present day/time data), etc. Additionally, the forecasting engine 1604 can receive vehicle data transmitted from the provider device 105 to the provider efficiency control system 102.

Further, in some embodiments, the provider efficiency data manager 1606 handles the sending, receiving, storing, requesting, analyzing, and/or determining of provider efficiency data. For example, the provider efficiency data manager 1606 can determine a provider efficiency parameter for one or more geohashes, determine a number of online mode slots for one or more geohashes, prioritize filling the online mode slots with the provider devices 105a-105n, and make real-time adjustments to the provider efficiency data and associated online mode slots. Additionally, the provider efficiency data manager 1606 can execute logic for determining whether an online mode control condition is active and/or should be activated (e.g., due to the provider efficiency parameter being outside a target range).

Further, in some embodiments, the ETA data manager 1608 handles the sending, receiving, storing, requesting, analyzing, and/or determining of ETA data. For example, the ETA data manager 1608 can determine ETA metrics for one or more geohashes and determine ETA relationships between geohashes, providers and/or requestors. Additionally, the ETA data manager 1608 can execute logic for determining whether an online mode control condition is active and/or should be activated (e.g., due to an ETA constraint being within an upper bound).

As further illustrated, the provider efficiency control system 102 includes the provider device manager 1610, which handles a ride performance data manager 1612 and a driver behavior data manager 1614. In some embodiments, the ride performance data manager 1612 handles the sending, receiving, storing, requesting, analyzing, and/or determining of the metrics discussed above for the geohash conditions 202 that relate to the provider devices 105a-105n (e.g., position, direction, speed, idle time, pickup time, service time, etc.). In these or other embodiments, the ride performance data manager 1612 can handle driver ratings and reviews, vehicle type, service category type (e.g., standard, wheel-chair accessible, premium, luxury, shared, shared saver, etc.), driver preferences, and/or any other suitable data.

Further, the driver behavior data manager 1614 handles the sending, receiving, storing, requesting, analyzing, and/or determining of any decisions, selections, patterns, and any information derivative therefrom as related to the provider devices 105a-105n and their associated providers. For example, the driver behavior data manager 1614 may track accepted transport requests, lapsed transport requests (i.e., gone unaccepted), cancelled transport requests (i.e., accepted and then aborted), etc. Additionally or alternatively, the driver behavior data manager 1614 may track usual driving hours, routes, areas, and patterns of activity for the provider devices 105a-105n while in the online mode 210.

Additionally illustrated in FIG. 16, the provider efficiency control system 102 includes the storage manager 1616 configured to store any suitable type of data. As shown, the storage manager 1616 can store target parameters 1618, such as time thresholds, lapse/cancellation thresholds, ETA thresholds, provider efficiency parameter thresholds, etc. In some embodiments, the storage manager 1616 can store the target parameters 1618 and/or any other parameters. Additionally, the storage manager 1616 can permit adjustment, configuration, and/or optimization of the target parameters 1618 and other parameters as applicable.

FIGS. 1-16, the corresponding text, and the examples provide several different systems, methods, techniques, components, and/or devices of the provider efficiency control system 102 in accordance with one or more embodiments. In addition to the above description, FIGS. 17A-17D illustrate respective flowcharts of a series of acts 1700a and 1700d for regulating access to an online mode for a transportation matching system in accordance with one or more embodiments. The provider efficiency control system 102 may perform one or more acts of the series of acts 1700a and 1700d in addition to or alternatively to one or more acts described in conjunction with other figures. While FIGS. 17A-17D illustrates acts according to four respective embodiments, alternative embodiments may omit, add to, reorder, and/or modify any of the acts shown in FIGS. 17A-17D. The acts of FIGS. 17A-17D can be performed as part of a method. Alternatively, a non-transitory computer-readable medium can comprise instructions that, when executed by one or more processors, cause a computing device to perform the acts of FIGS. 17A-17D. In some embodiments, a system can perform the acts of FIGS. 17A-17D.

Figure 17A:
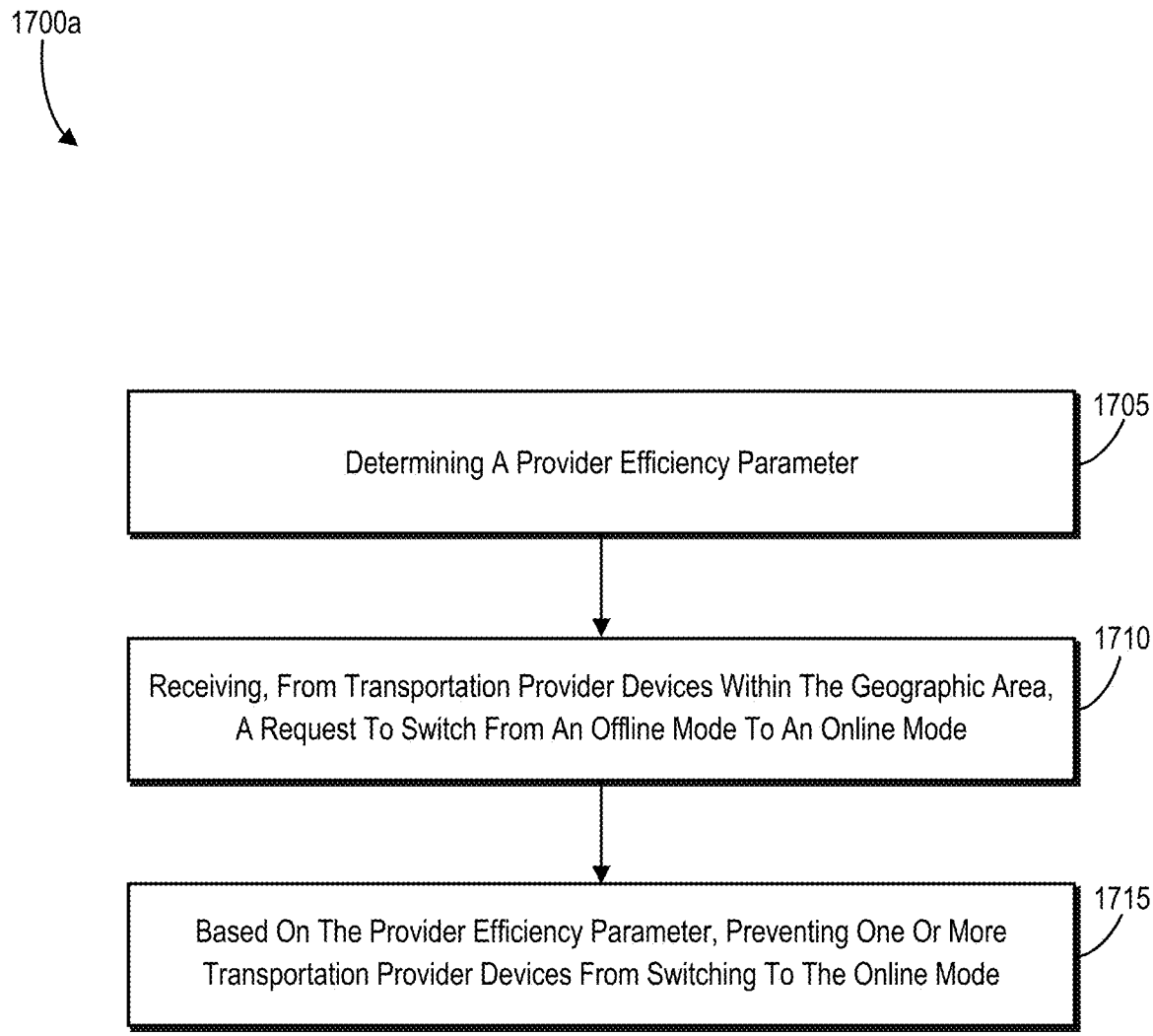
FIGS. 17A-17D each respectively illustrate a flowchart of a series of acts in a method of regulating access to an online mode for a transportation matching system in accordance with one or more embodiments.

As shown in FIG. 17A, the series of acts 1700a includes an act 1705 of determining, for a geographic area, a provider efficiency parameter associated with a dynamic transportation matching system. The series of acts 1700a further includes an act 1710 of receiving, from transportation provider devices within the geographic area, a request to switch from an offline mode to an online mode for the dynamic transportation matching system. In addition, the series of acts 1700a includes an act 1715 of, based on the provider efficiency parameter associated with the geographic area, preventing one or more of the transportation provider devices from switching to the online mode within the geographic area.

It is understood that the outlined acts in the series of acts 1700a are only provided as examples, and some of the acts may be optional, combined into fewer acts, or expanded into additional acts without detracting from the essence of the disclosed embodiments. As an example of one or more additional or alternative acts not shown in FIG. 17A, act(s) in the series of acts 1700a may include activating, based on the provider efficiency parameter, an online mode control condition for the geographic area. As another example, act(s) in the series of acts 1700a may include: determining a priority for the transportation provider devices; and preventing the one or more transportation provider devices from switching to the online mode based on the priority of the transportation provider devices. In these or other embodiments, the priority is based on historical data associated with the transportation provider devices.

In yet another example of one or more additional or alternative acts not shown in FIG. 17A, act(s) in the series of acts 1700a may include providing, to the one or more transportation provider devices, a notification that online mode is restricted for the geographic area. In some embodiments, the notification comprises a selectable option to request notice when the online mode is available for the geographic area. Further, an example of one or more additional or alternative acts not shown in FIG. 17A, act(s) in the series of acts 1700a may include providing, for display by at least one of the transportation provider devices, a map interface comprising indications of online mode restrictions across different geographic areas.

Figure 17B:
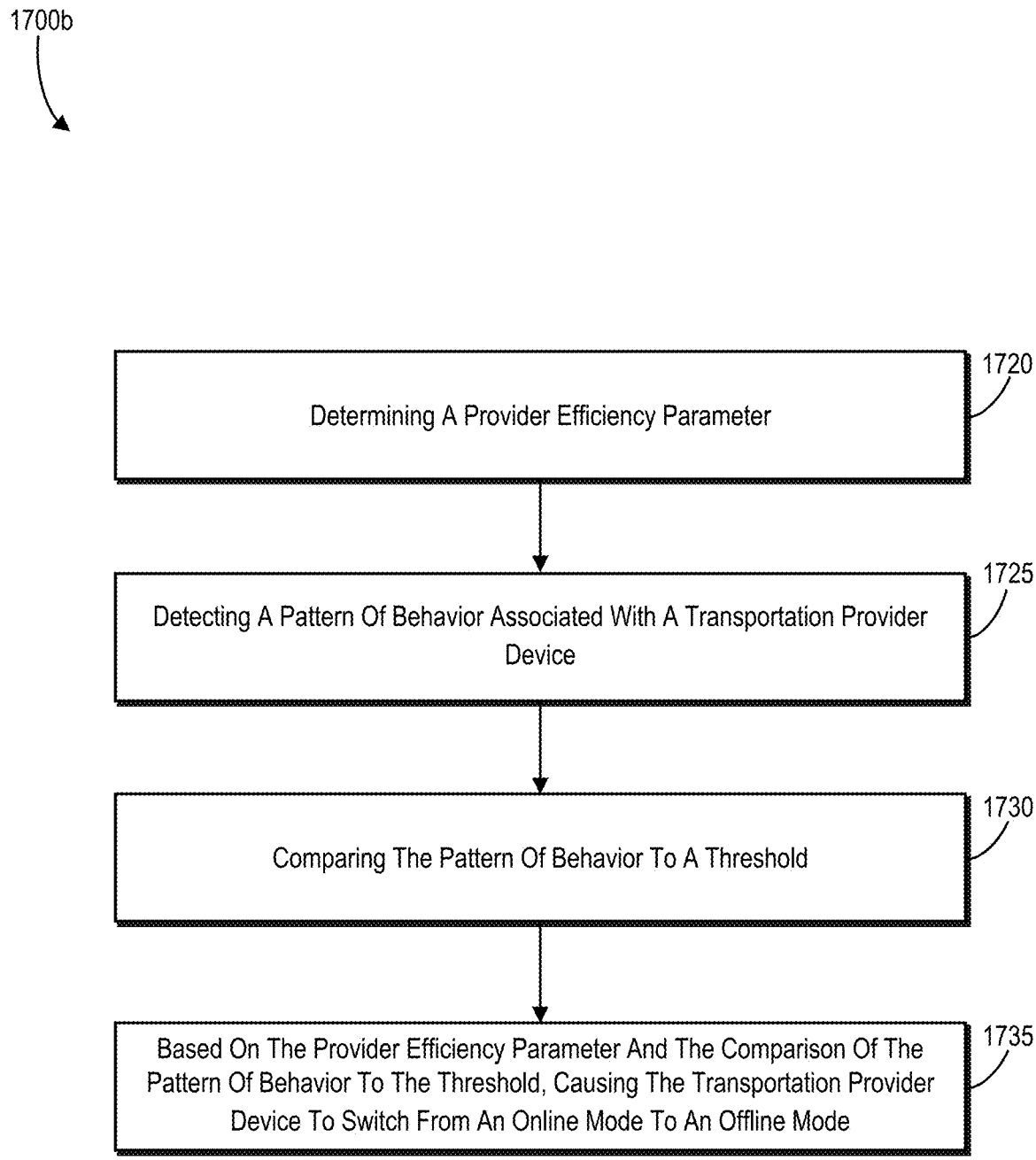

With respect to FIG. 17B, the series of acts 1700b includes an act 1720 of determining, for a geographic area, a provider efficiency parameter associated with a dynamic transportation matching system.

In addition, the series of acts 1700b includes an act 1725 of detecting a pattern of behavior associated with a transportation provider device within the geographic area. In some embodiments, detecting the pattern of behavior comprises detecting an amount of idle time for the transportation provider device. Additionally or alternatively, in some embodiments, detecting the pattern of behavior comprises detecting a number of ride cancellations or ride-assignment lapses for the transportation provider device.

Further, the series of acts 1700b includes an act 1730 of comparing the pattern of behavior to a threshold. In some embodiments, comparing the pattern of behavior to the threshold comprises comparing the amount of idle time to a threshold idle time. Additionally or alternatively, in some embodiments, comparing the pattern of behavior to the threshold comprises comparing the number of ride cancellations or ride-assignment lapses to a threshold number of ride cancellations or ride-assignment lapses.

In addition, the series of acts 1700b includes an act 1735 of, based on the provider efficiency parameter and the comparison of the pattern of behavior to the threshold, causing the transportation provider device to switch from an online mode to an offline mode.

It is understood that the outlined acts in the series of acts 1700b are only provided as examples, and some of the acts may be optional, combined into fewer acts, or expanded into additional acts without detracting from the essence of the disclosed embodiments. As an example of one or more additional or alternative acts not shown in FIG. 17B, act(s) in the series of acts 1700b may include providing a notification to the transportation provider device comprising information associated with switching the transportation provider device to the offline mode. In these or other embodiments, the notification indicates an idle condition or one or more consecutive ride cancellations or ride-assignment lapses associated with the transportation provider device. In another example, act(s) in the series of acts 1700b may include: determining a priority for transportation provider devices within the geographic area; and allowing one or more of the transportation provider devices to switch from the offline mode to the online mode in accordance with the priority. In some embodiments, the priority is based on historical data associated with the transportation provider devices.

Figure 17C:
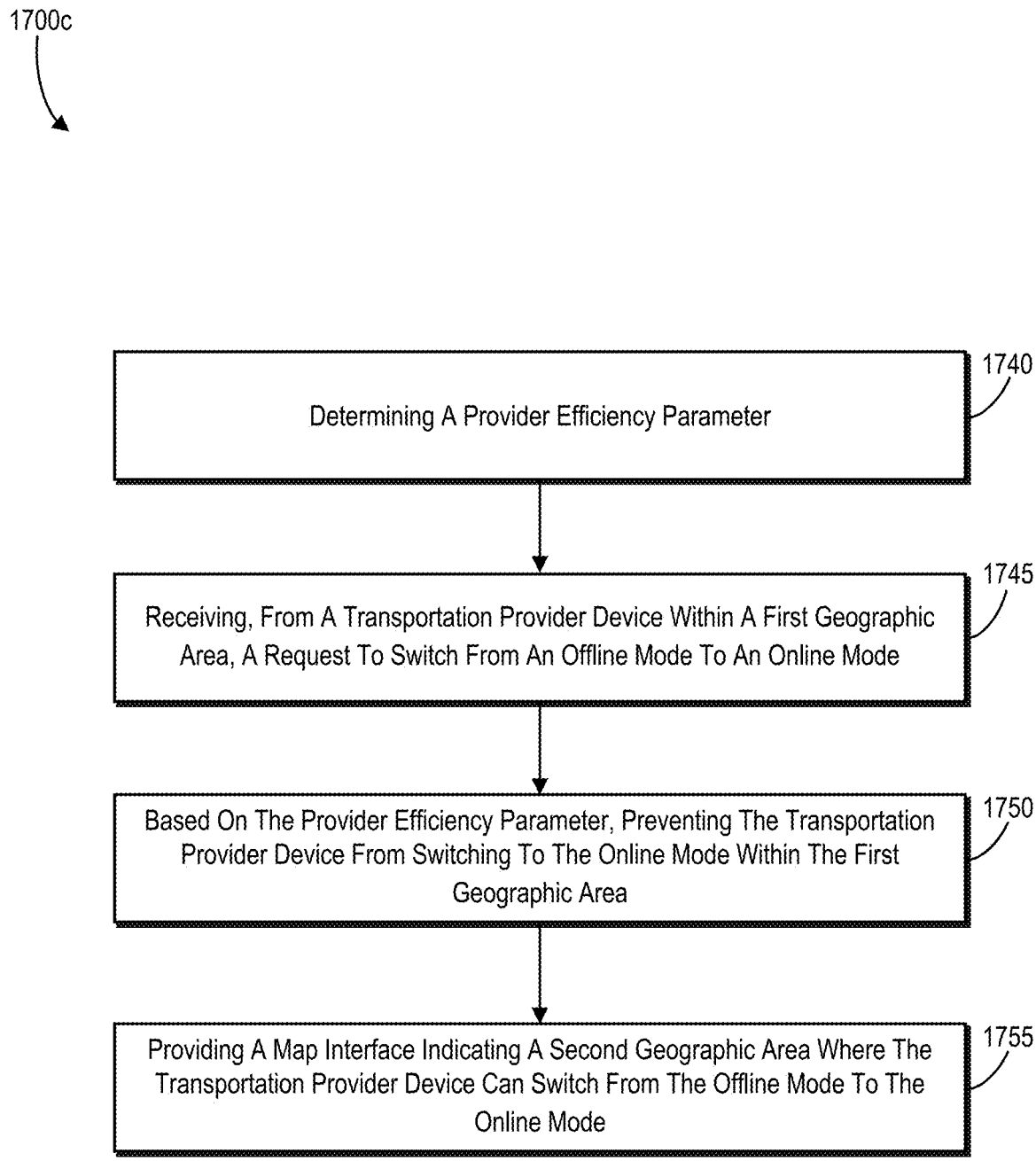

With respect to FIG. 17C, the series of acts 1700c includes an act 1740 of determining, for a first geographic area, a provider efficiency parameter associated with a dynamic transportation matching system. In addition, the series of acts 1700c includes an act 1745 of receiving, from a transportation provider device within the first geographic area, a request to switch from an offline mode to an online mode for the dynamic transportation matching system. Further, the series of acts 1700c includes an act 1750 of, based on the provider efficiency parameter associated with the first geographic area, preventing the transportation provider device from switching to the online mode within the first geographic area. Additionally, the series of acts 1700c includes an act 1755 of providing, for display by the transportation provider device, a map interface indicating a second geographic area different from the first geographic area, where the transportation provider device can switch from the offline mode to the online mode.

It is understood that the outlined acts in the series of acts 1700c are only provided as examples, and some of the acts may be optional, combined into fewer acts, or expanded into additional acts without detracting from the essence of the disclosed embodiments. As an example of one or more additional or alternative acts not shown in FIG. 17C, act(s) in the series of acts 1700c may include providing, for display by the transportation provider device, a selectable option for reserving an online mode slot for the second geographic area. As another example, act(s) in the series of acts 1700c may include reserving, based on a selection of the selectable option, the online mode slot for the transportation provider device for the second geographic area. In yet another example, act(s) in the series of acts 1700c may include canceling the reservation of the online mode slot for the transportation provider device for the second geographic area if the transportation provider device does not relocate to the second geographic area within a predetermined amount of time.

As a further example, act(s) in the series of acts 1700c may include: determining a priority for transportation provider devices; and selectively filling online mode slots within the first geographic area and the second geographic area based at least in part on the priority for the transportation provider devices. Additionally or alternatively, act(s) in the series of acts 1700c may include determining the priority for the transportation provider devices based on historical data associated with the transportation provider devices. Further, act(s) in the series of acts 1700c may include, in response to determining that the transportation provider device has relocated to the second geographic area, allowing the transportation provider device to switch from the offline mode to the online mode within the second geographic area.

Figure 17D:
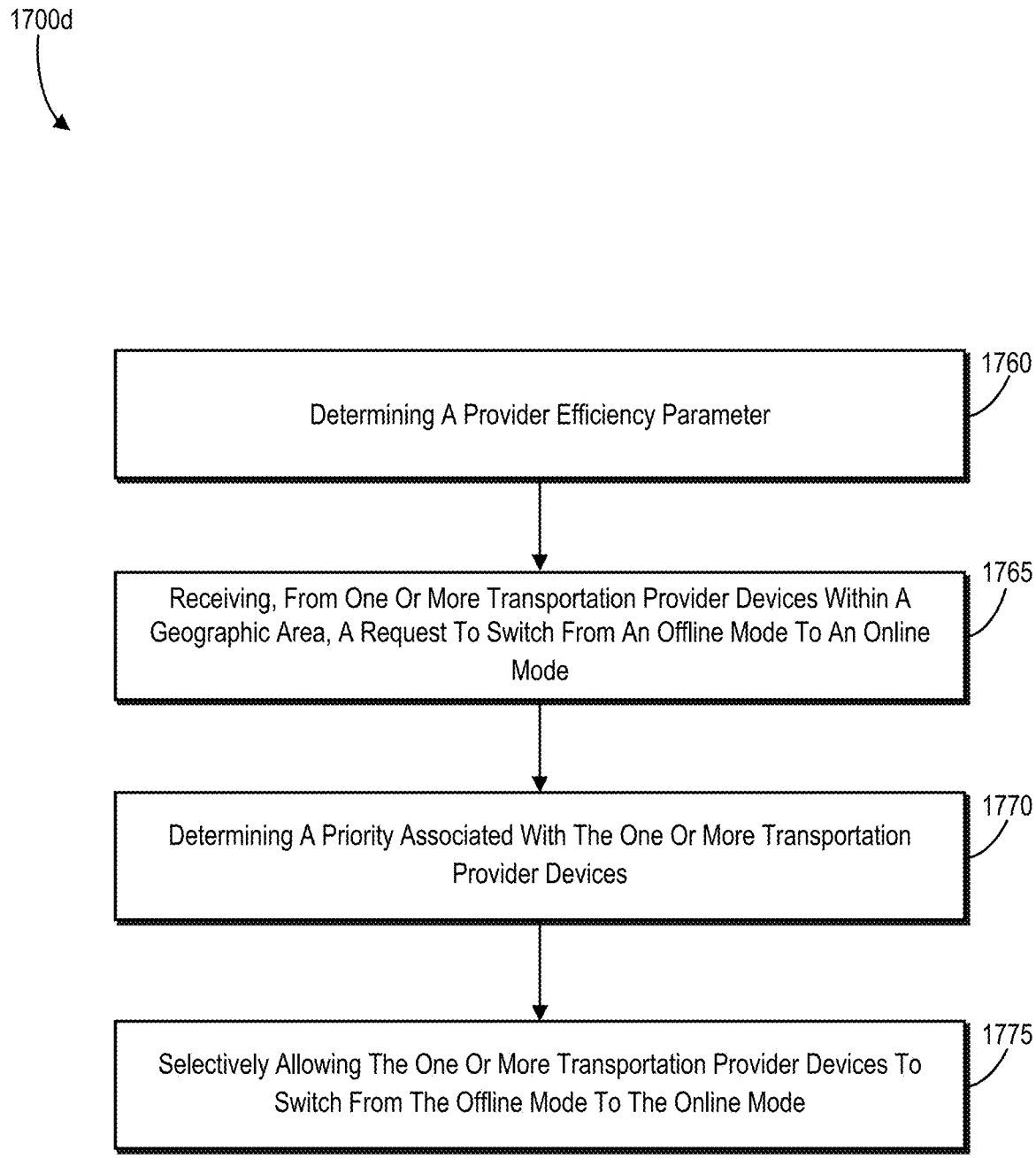

With respect to FIG. 17D, the series of acts 1700d includes an act 1760 of determining, a dynamic transportation matching system, a provider efficiency parameter for a geographic area. For example, in some embodiments, the geographic area comprises a geohash. In addition, the series of acts 1700d includes an act 1765 of receiving, from one or more transportation provider devices within the geographic area, a request to switch from an offline mode to an online mode for the dynamic transportation matching system.

Further, the series of acts 1700d includes an act 1770 of determining a priority associated with the one or more transportation provider devices. In some embodiments, the priority is based on historical data associated with the one or more transportation provider devices. Additionally or alternatively, in some embodiments, the priority is based on at least one of an acceptance rate for each of the one or more transportation provider devices, a number of completed rides for each of the one or more transportation provider devices, a rating for each of the one or more transportation provider devices, or available ride types for each of the one or more transportation provider devices. Additionally or alternatively, in some embodiments, the priority regulates access for filling available slots within the geographic area for the dynamic transportation matching system.

Additionally, the series of acts 1700d includes an act 1775 of selectively allowing the one or more transportation providers to switch from the offline mode to the online mode based on the provider efficiency parameter and the prioritization. In some embodiments, selectively allowing the one or more transportation providers to switch from the offline mode to the online mode comprises allowing a first transportation provider device to switch to the online mode and initially preventing a second transportation provider device from switching to the online mode. Additionally or alternatively, in some embodiments, selectively allowing the one or more transportation providers to switch from the offline mode to the online mode further comprises subsequently allowing the second transportation provider device to switch to the online mode.

Further, as with FIGS. 17A-17C, it is understood that the outlined acts in the series of acts 1700d of FIG. 17D are only provided as examples, and some of the acts may be optional, combined into fewer acts, or expanded into additional acts without detracting from the essence of the disclosed embodiments.

Figure 18:
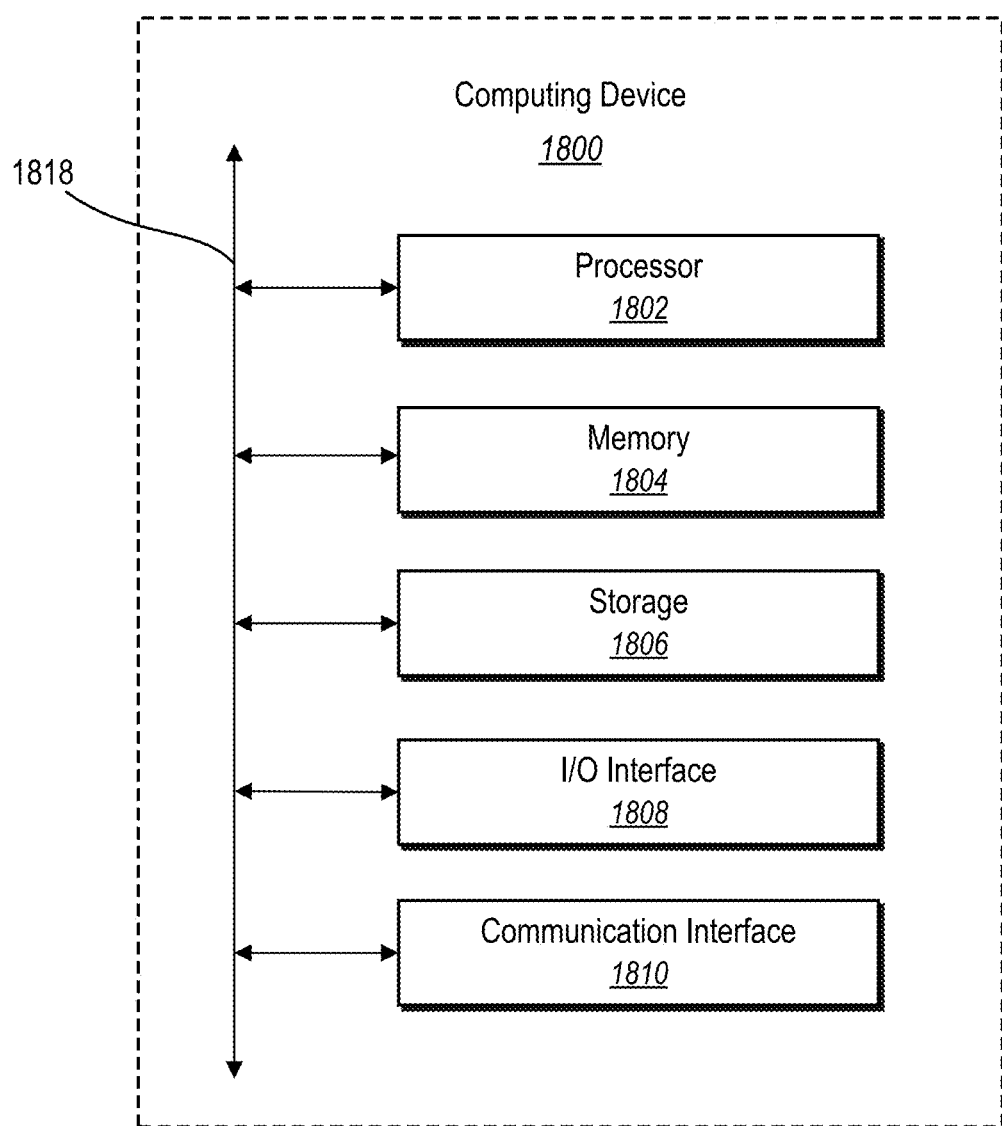
FIG. 18 illustrates a block diagram of an example computing device in accordance with one or more embodiments.

FIG. 18 illustrates a block diagram of an example computing device 1800 that may be configured to perform one or more of the processes described above. One will appreciate that one or more computing devices, such as the computing device 1800 may represent the computing devices described above (e.g., the computing system 1600, the server(s) 104, and the computing device 602). In one or more embodiments, the computing device 1800 may be a mobile device (e.g., a mobile telephone, a smartphone, a PDA, a tablet, a laptop, a camera, a tracker, a watch, a wearable device, etc.). In some embodiments, the computing device 1800 may be a non-mobile device (e.g., a desktop computer or another type of client device). Further, the computing device 1800 may be a server device that includes cloud-based processing and storage capabilities.

As shown in FIG. 18, the computing device 1800 can include one or more processor(s) 1802, memory 1804, a storage device 1806, input/output interfaces 1808 (or "I/O interfaces 1808"), and a communication interface 1810, which may be communicatively coupled by way of a communication infrastructure (e.g., bus 1818). While the computing device 1800 is shown in FIG. 18, the components illustrated in FIG. 18 are not intended to be limiting. Additional or alternative components may be used in other embodiments. Furthermore, in certain embodiments, the computing device 1800 includes fewer components than those shown in FIG. 18. Components of the computing device 1800 shown in FIG. 18 will now be described in additional detail.

In particular embodiments, the processor(s) 1802 includes hardware for executing instructions, such as those making up a computer program. As an example, and not by way of limitation, to execute instructions, the processor(s) 1802 may retrieve (or fetch) the instructions from an internal register, an internal cache, memory 1804, or a storage device 1806 and decode and execute them.

The computing device 1800 includes memory 1804, which is coupled to the processor(s) 1802. The memory 1804 may be used for storing data, metadata, and programs for execution by the processor(s). The memory 1804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1804 may be internal or distributed memory.

The computing device 1800 includes a storage device 1806 includes storage for storing data or instructions. As an example, and not by way of limitation, the storage device 1806 can include a non-transitory storage medium described above. The storage device 1806 may include a hard disk drive (HDD), flash memory, a Universal Serial Bus (USB) drive or a combination these or other storage devices.

As shown, the computing device 1800 includes one or more I/O interfaces 1808, which are provided to allow a user to provide input to (such as user strokes), receive output from, and otherwise transfer data to and from the computing device 1800. These I/O interfaces 1808 may include a mouse, keypad or a keyboard, a touch screen, camera, optical scanner, network interface, modem, other known I/O devices or a combination of such I/O interfaces 1808. The touch screen may be activated with a stylus or a finger.

The I/O interfaces 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1808 are configured to provide graphical data to a display for presentation to a user. The graphical data may be representative of one or more graphical user interfaces and/or any other graphical content as may serve a particular implementation.

The computing device 1800 can further include a communication interface 1810. The communication interface 1810 can include hardware, software, or both. The communication interface 1810 provides one or more interfaces for communication (such as, for example, packet-based communication) between the computing device and one or more other computing devices or one or more networks. As an example, and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI. The computing device 1800 can further include a bus 1818. The bus 1818 can include hardware, software, or both that connects components of the computing device 1800 to each other.

Figure 19:
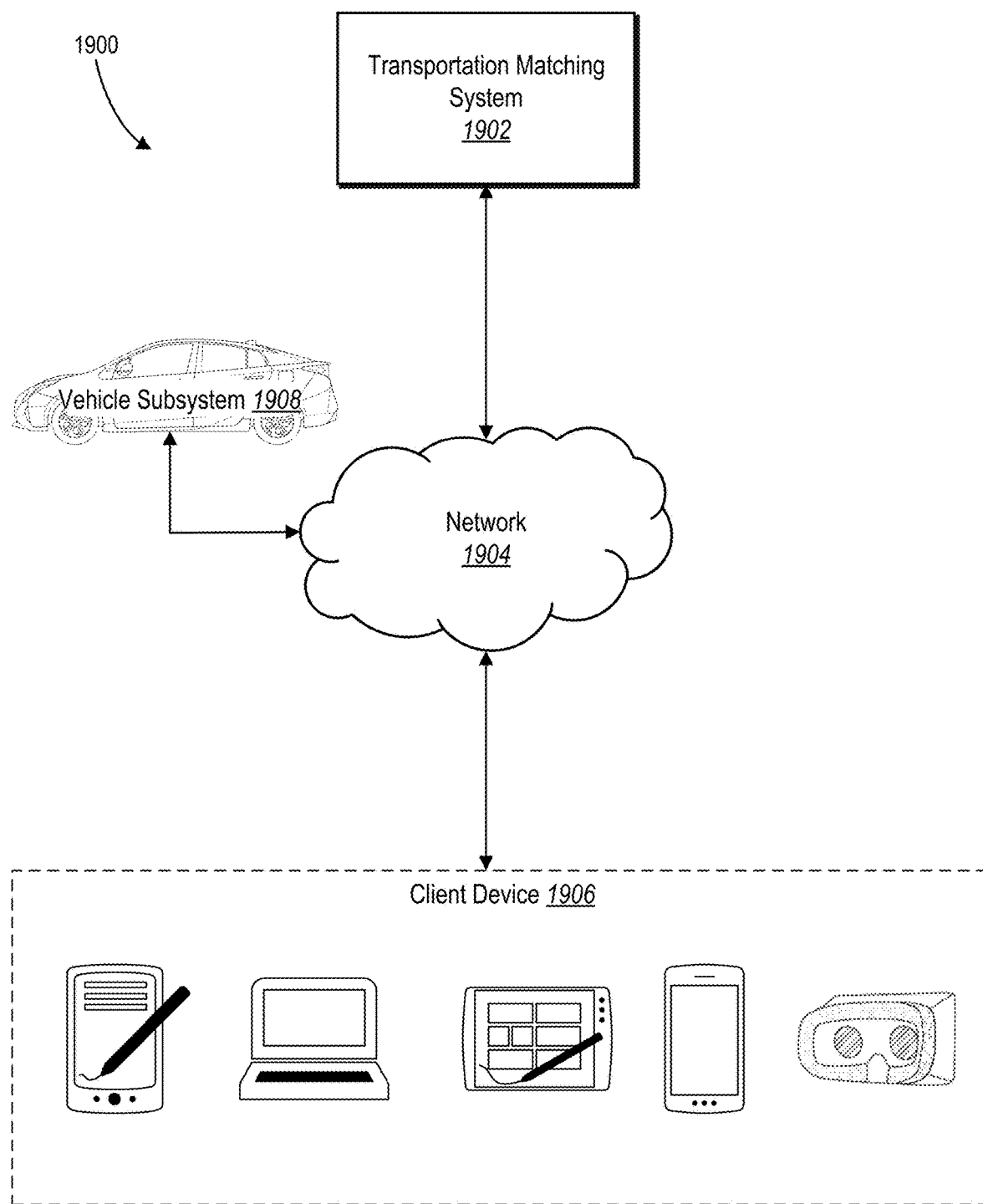
FIG. 19 illustrates an example network environment of a transportation matching system in accordance with one or more embodiments.

FIG. 19 illustrates an example network environment 1900 of a transportation matching system (e.g., the dynamic transportation matching system 103). The network environment 1900 includes a client device 1906, a transportation matching system 1902, and a vehicle subsystem 1908 connected to each other by a network 1904. Although FIG. 19 illustrates a particular arrangement of the client device 1906, the transportation matching system 1902, the vehicle subsystem 1908, and the network 1904, this disclosure contemplates any suitable arrangement of the client device 1906, the transportation matching system 1902, the vehicle subsystem 1908, and the network 1904. As an example, and not by way of limitation, two or more of the client device 1906, the transportation matching system 1902, and the vehicle subsystem 1908 communicate directly, bypassing the network 1904. As another example, two or more of the client device 1906, the transportation matching system 1902, and the vehicle subsystem 1908 may be physically or logically co-located with each other in whole or in part. Moreover, although FIG. 19 illustrates a particular number of the client devices 1906, the transportation matching systems 1902, the vehicle subsystems 1908, and the networks 1904, this disclosure contemplates any suitable number of the client devices 1906, the transportation matching systems 1902, the vehicle subsystems 1908, and the networks 1904. As an example, and not by way of limitation, the network environment 1900 may include multiple client devices 1906, the transportation matching systems 1902, the vehicle subsystems 1908, and the networks 1904.

This disclosure contemplates any suitable network 1904. As an example, and not by way of limitation, one or more portions of the network 1904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1904 may include one or more networks 1904.

Links may connect the client device 1906, the transportation matching system 1902, and the vehicle subsystem 1908 to the communication network 1904 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1900. One or more first links may differ in one or more respects from one or more second links.

In particular embodiments, the client device 1906 may be an electronic device including hardware, software, or embedded logic components or a combination of two or more such components and capable of carrying out the appropriate functionalities implemented or supported by the client device 1906. As an example, and not by way of limitation, a client device 1906 may include any of the computing devices discussed above in relation to FIG. 19. A client device 1906 may enable a network user at the client device 1906 to access a network. A client device 1906 may enable its user to communicate with other users at other client devices 1906.

In particular embodiments, the client device 1906 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1906 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1906 one or more Hyper Text Markup Language (HTML) files responsive to the HTTP request. The client device 1906 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1902 may be a network-addressable computing system that can host a ride share transportation network. The transportation matching system 1902 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 1902. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 1902 may manage ride matching services to connect a user/requester with a vehicle and/or provider. By managing the ride matching services, the transportation matching system 1902 can manage the distribution and allocation of vehicle subsystem resources and user resources such as GPS location and availability indicators, as described herein.

The transportation matching system 1902 may be accessed by the other components of the network environment 1900 either directly or via network 1904. In particular embodiments, the transportation matching system 1902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1906, or a transportation matching system 1902 to manage, retrieve, modify, add, or delete, the information stored in data store.

In particular embodiments, the transportation matching system 1902 may provide users with the ability to take actions on various types of items or objects, supported by the transportation matching system 1902. As an example, and not by way of limitation, the items and objects may include ride share networks to which users of the transportation matching system 1902 may belong, vehicles that users may request, location designators, computer-based applications that a user may use, transactions that allow users to buy or sell items via the service, interactions with advertisements that a user may perform, or other suitable items or objects.

A user may interact with anything that is capable of being represented in the transportation matching system 1902 or by an external system of a third-party system, which is separate from the transportation matching system 1902 and coupled to the transportation matching system 1902 via a network 1904.

In particular embodiments, the transportation matching system 1902 may be capable of linking a variety of entities. As an example, and not by way of limitation, the transportation matching system 1902 may enable users to interact with each other or other entities, or to allow users to interact with these entities through an application programming interfaces (API) or other communication channels.

In particular embodiments, the transportation matching system 1902 may include a variety of servers, sub-systems, programs, modules, logs, and data stores. In particular embodiments, the transportation matching system 1902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1902 may also include suitable components such as network interfaces, security mechanisms, load balancers, failover servers, management-and-network-operations consoles, other suitable components, or any suitable combination thereof. In particular embodiments, the transportation matching system 1902 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1902 and one or more client devices 1906. An action logger may be used to receive communications from a web server about a user's actions on or off the transportation matching system 1902. In conjunction with the action log, a third-party-content-object log may be maintained of user exposures to third-party-content objects. A notification controller may provide information regarding content objects to a client device 1906. Information may be pushed to a client device 1906 as notifications, or information may be pulled from the client device 1906 responsive to a request received from the client device 1906. Authorization servers may be used to enforce one or more privacy settings of the users of the transportation matching system 1902. A privacy setting of a user determines how particular information associated with a user can be shared. The authorization server may allow users to opt in to or opt out of having their actions logged by the transportation matching system 1902 or shared with other systems, such as, for example, by setting appropriate privacy settings. Third-party-content-object stores may be used to store content objects received from third parties. Location stores may be used for storing location information received from the client devices 1906 associated with users.

In addition, the vehicle subsystem 1908 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1908 can include an autonomous vehicle—i.e., a vehicle that does not require a human operator. In these embodiments, the vehicle subsystem 1908 can perform maneuvers, communicate, and otherwise function without the aid of a human provider, in accordance with available technology.

In particular embodiments, the vehicle subsystem 1908 may include one or more sensors incorporated therein or associated thereto. For example, sensor(s) can be mounted on the top of the vehicle subsystem 1908 or else can be located within the interior of the vehicle subsystem 1908. In certain embodiments, the sensor(s) can be located in multiple areas at once—i.e., split up throughout the vehicle subsystem 1908 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1908 may include a communication device capable of communicating with the client device 1906 and/or the transportation matching system 1902. For example, the vehicle subsystem 1908 can include an on-board computing device communicatively linked to the network 1904 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, for a geographic area, a provider efficiency parameter associated with a dynamic transportation matching system;
   receiving, from transportation provider devices within the geographic area, requests to switch provider device applications from an offline mode to an online mode for the dynamic transportation matching system; and
   based on the provider efficiency parameter associated with the geographic area, preventing a transportation provider device of the transportation provider devices from switching a provider device applications from the offline mode to the online mode within the geographic area, by providing, for display via the provider device application, a user interface indicating that the provider device application cannot switch to the online mode.

2. The computer-implemented method of claim 1, further comprising activating, based on the provider efficiency parameter, an online mode control condition for the geographic area.

3. The computer-implemented method of claim 1, further comprising:
   determining a priority for the transportation provider devices; and
   preventing one or more of the transportation provider devices from switching to the online mode based on the priority of the transportation provider devices.

4. The computer-implemented method of claim 3, wherein the priority is based on historical data associated with the transportation provider devices.

5. The computer-implemented method of claim 1, further comprising:
   providing, for display to the transportation provider device via the provider device application, an option to reserve a slot for a time frame to switch the provider device application from the offline mode to the online mode.

6. The computer-implemented method of claim 1, further comprising:
   providing a notification with a selectable option to request notice when the online mode is available for the geographic area.

7. The computer-implemented method of claim 1, further comprising providing, for display by the transportation provider device, a map interface comprising indications of online mode restrictions across different geographic areas, and selectable elements for reserving an online slot within the different geographic areas.

8. A dynamic transportation matching system comprising:
one or more memory devices; and
one or more computing devices configured to:
- determine, for a geographic area, a provider efficiency parameter associated with a dynamic transportation matching system;
- receive, from transportation provider devices within the geographic area, requests to switch provider device applications from an offline mode to an online mode for the dynamic transportation matching system; and
- based on the provider efficiency parameter associated with the geographic area, prevent a transportation provider device of the transportation provider devices from switching a provider device application from the offline mode to the online mode within the geographic area, by providing, for display via the provider device applications, a user interface indicating that the provider device application cannot switch to the online mode.

9. The dynamic transportation matching system of claim 8, wherein the one or more computing devices are further configured to activate, based on the provider efficiency parameter, an online mode control condition for the geographic area.

10. The dynamic transportation matching system of claim 8, wherein the one or more computing devices are further configured to:
- determine a priority for the transportation provider devices; and
- prevent one or more of the transportation provider devices from switching to the online mode based on the priority of the transportation provider devices.

11. The dynamic transportation matching system of claim 10, wherein the priority is based on historical data associated with the transportation provider devices.

12. The dynamic transportation matching system of claim 8, wherein the one or more computing devices are further configured to provide, for display to the transportation provider device via the provider device application, an option to reserve a slot for a time frame to switch the provider device application from the offline mode to the online mode.

13. The dynamic transportation matching system of claim 8, wherein the one or more computing devices are further configured to:
- provide notifications comprising a selectable option to request notice when the online mode is available for the geographic area.

14. The dynamic transportation matching system of claim 8, wherein the one or more computing devices are further configured to provide, for display by the transportation provider devices, a map interface comprising indications of online mode restrictions across different geographic areas, and selectable elements for reserving an online slot within the different geographic areas.

15. A non-transitory computer-readable medium comprising instructions that, when executed by at least one processor, cause a computer system to:
- determine, for a geographic area, a provider efficiency parameter associated with a dynamic transportation matching system;
- receive, from transportation provider devices within the geographic area, requests to switch provider device applications from an offline mode to an online mode for the dynamic transportation matching system; and
- based on the provider efficiency parameter associated with the geographic area, prevent a transportation provider device of the transportation provider devices from switching a provider device application from the offline mode to the online mode within the geographic area, by providing, for display via the provider device application, a user interface indicating that the provider device application cannot switch to the online mode.

16. The non-transitory computer-readable medium of claim 15, further comprising instructions, that when executed by the at least one processor, cause the computer system to activate, based on the provider efficiency parameter, an online mode control condition for the geographic area.

17. The non-transitory computer-readable medium of claim 15, further comprising instructions, that when executed by the at least one processor, cause the computer system to:
- determine a priority for the transportation provider devices; and
- prevent one or more of the transportation provider devices from switching to the online mode based on the priority of the transportation provider devices.

18. The non-transitory computer-readable medium of claim 17, wherein the priority is based on historical data associated with the transportation provider devices.

19. The non-transitory computer-readable medium of claim 15, further comprising instructions, that when executed by the at least one processor, cause the computer system to provide, for display to the transportation provider device via the provider device application, an option to reserve a slot for a time frame to switch the provider device application from the offline mode to the online mode.

20. The non-transitory computer-readable medium of claim 15, further comprising instructions, that when executed by the at least one processor, cause the computer system to: provide notifications comprising a selectable option to request notice when the online mode is available for the geographic area.

* * * * *